(12) United States Patent
Nguyen et al.

(10) Patent No.: US 9,816,365 B2
(45) Date of Patent: Nov. 14, 2017

(54) FRACTURING TREATMENTS IN SUBTERRANEAN FORMATIONS USING REDUCIBLE MATERIALS

(71) Applicant: Halliburton Energy Services, Inc., Houston, TX (US)

(72) Inventors: Philip D. Nguyen, Houston, TX (US); Jason E. Bryant, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/907,232

(22) PCT Filed: Aug. 23, 2013

(86) PCT No.: PCT/US2013/056465
§ 371 (c)(1),
(2) Date: Jan. 22, 2016

(87) PCT Pub. No.: WO2015/026369
PCT Pub. Date: Feb. 26, 2015

(65) Prior Publication Data
US 2016/0153273 A1 Jun. 2, 2016

(51) Int. Cl.
*E21B 43/267* (2006.01)
*E21B 43/26* (2006.01)
(Continued)

(52) U.S. Cl.
CPC .......... *E21B 43/267* (2013.01); *C09K 8/5751* (2013.01); *C09K 8/5758* (2013.01);
(Continued)

(58) Field of Classification Search
CPC ......... E21B 43/267; E21B 43/26; C09K 8/68; C09K 8/90; C09K 8/805; C09K 8/88; C09K 43/26; C09K 2208/18
(Continued)

(56) References Cited

U.S. PATENT DOCUMENTS 6,938,693 B2 * 9/2005 Boney .................. C09K 8/62
166/280.1
7,044,220 B2 5/2006 Nguyen et al.
(Continued)

FOREIGN PATENT DOCUMENTS

EP 2469020 A1 6/2012

OTHER PUBLICATIONS

International Preliminary Report on Patentability issued in related PCT application No. PCT/US2013/056465, dated Mar. 3, 2016. 9 pages.
(Continued)

*Primary Examiner* — Silvana Runyan
(74) *Attorney, Agent, or Firm* — Craig Roddy; Baker Botts L.L.P.

(57) ABSTRACT

A method of servicing a wellbore in a subterranean formation comprising placing in the wellbore and/or subterranean formation a pad fluid and forming a fracture in the subterranean formation. Next, a first slurry fluid may be placed into the fracture in the subterranean formation. The first slurry fluid may comprise a reducible material and a first particulate material. Next, a second slurry fluid and a spacer fluid may be placed into the fracture in the subterranean formation in an alternating sequence. The second slurry fluid may comprise a second particulate material. Then, the fracture is allowed to close and the fluids are allowed to break. Finally, the reducible materials degrade, to form a particulate-laden proppant pack (PLPP).

16 Claims, 1 Drawing Sheet

(51) Int. Cl.
   *C09K 8/575* (2006.01)
   *C09K 8/68* (2006.01)
   *C09K 8/80* (2006.01)
   *C09K 8/88* (2006.01)
   *C09K 8/90* (2006.01)

(52) U.S. Cl.
   CPC ............... *C09K 8/68* (2013.01); *C09K 8/80* (2013.01); *C09K 8/805* (2013.01); *C09K 8/88* (2013.01); *C09K 8/90* (2013.01); *E21B 43/26* (2013.01); *C09K 2208/18* (2013.01)

(58) Field of Classification Search
   USPC ...................................................... 166/280.1
   See application file for complete search history.

(56) References Cited

U.S. PATENT DOCUMENTS

| | | |
|---|---|---|
| 7,073,581 B2 | 7/2006 | Nguyen et al. |
| 7,281,581 B2 | 10/2007 | Nguyen et al. |
| 7,325,608 B2 | 2/2008 | Batenburg et al. |
| 7,581,590 B2 | 9/2009 | Lesko et al. |
| 7,883,740 B2 | 2/2011 | Nguyen et al. |
| 8,066,068 B2 | 11/2011 | Lesko et al. |
| 2004/0261995 A1* | 12/2004 | Nguyen ............... C09K 8/80 166/279 |
| 2011/0005753 A1 | 1/2011 | Todd et al. |
| 2011/0036571 A1* | 2/2011 | Vitalievich ............ E21B 43/11 166/280.1 |
| 2011/0114313 A1* | 5/2011 | Lesko ................... C09K 8/665 166/280.1 |
| 2012/0305247 A1 | 12/2012 | Chen et al. |
| 2012/0325472 A1* | 12/2012 | Litvinets ............... C09K 8/665 166/280.1 |
| 2014/0060828 A1* | 3/2014 | Nguyen ................ E21B 43/267 166/280.1 |

OTHER PUBLICATIONS

International Search Report and Written Opinion issued in related PCT Application No. PCT/US2013/056465 dated Apr. 30, 2014, 14 pages.

* cited by examiner

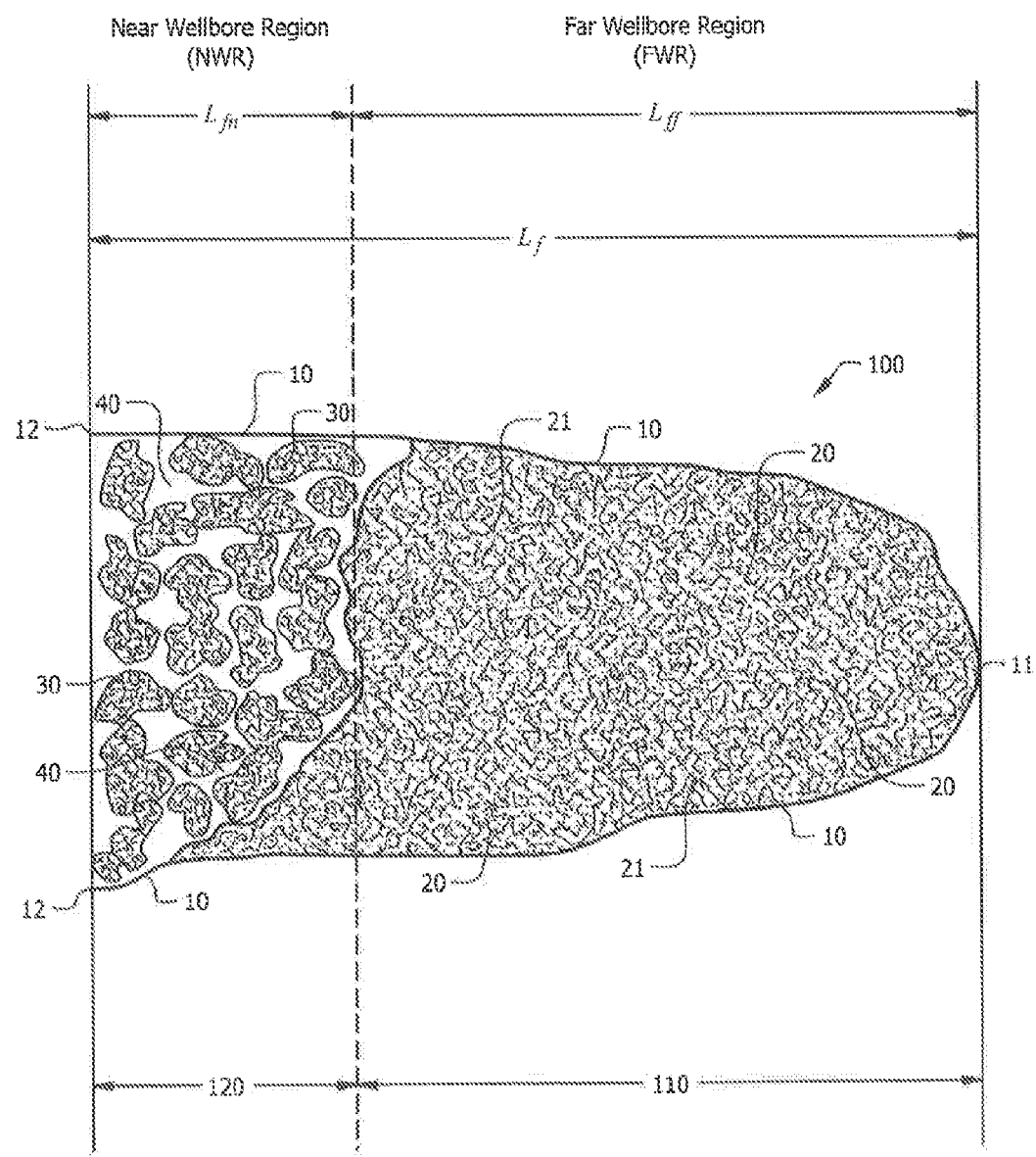

FRACTURING TREATMENTS IN SUBTERRANEAN FORMATIONS USING REDUCIBLE MATERIALS

CROSS-REFERENCE TO RELATED APPLICATION

The present application is a U.S. National Stage Application of International Application No. PCT/US2013/056465 filed Aug. 23, 2013, which is incorporated herein by reference in its entirety for all purposes.

BACKGROUND

This disclosure relates to methods of servicing a wellbore. More specifically, it relates to servicing a wellbore with particulate material compositions.

Natural resources (e.g., oil or gas) residing in the subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a treatment fluid (e.g., a fracturing fluid, a gravel packing fluid, etc.) may be pumped down the wellbore at a rate and a pressure sufficient to form fractures that extend into the formation, providing additional pathways through which the oil or gas can flow to the well.

To maintain the fractures open when the fracturing pressures are removed, a particulate material such as for example a propping agent (i.e., a proppant) may be used. Particulate packs (e.g., proppant packs) are typically introduced into the wellbore and surrounding formation during fracturing and completion operations in order to provide a structural frame for both downhole support and fluid collection, e.g., consolidate the wellbore and/or subterranean formation. The conductivity of the particulate pack (e.g., proppant pack) may be enhanced in some instances by promoting the formation of channels through the particulate pack (e.g., proppant pack), which may further lead to enhanced wellbore productivity. Conventional particulate materials that are generally used to form particulate packs with flow channels may include materials that have to meet certain specifications/standards. However, such materials add to the cost of wellbore servicing operations. Thus, an ongoing need exists for more effective compositions and methods of promoting the formation of channels through particulate packs (e.g., proppant packs) in subterranean formations.

SUMMARY

Disclosed herein is a method of servicing a wellbore in a subterranean formation comprising placing in the wellbore and/or subterranean formation a pad fluid and forming a fracture in the subterranean formation, placing in the fracture a first slurry fluid comprising a reducible material and a first particulate material and in an alternating sequence a second slurry fluid and a spacer fluid, wherein the second slurry fluid comprises a second particulate material, allowing the fracture to close, and allowing the fluids to break and the reducible materials to degrade, wherein a particulate-laden proppant pack (PLPP) is formed.

Also disclosed herein is a method of servicing a wellbore in a subterranean formation comprising placing in the wellbore and/or subterranean formation a pad fluid and forming a fracture in the subterranean formation, placing in the fracture a first slurry fluid comprising a reducible material and a plurality of low-grade sand clusters and in an alternating sequence a second slurry fluid and a spacer fluid, wherein the second slurry fluid comprises a plurality of low-grade sand clusters, and wherein the pad fluid and the spacer fluid are the same, allowing the fracture to close, and allowing the fluids to break and the reducible materials to degrade, wherein a particulate-laden proppant pack is formed.

Further disclosed herein is a particulate-laden proppant pack (PLPP) disposed within a fracture of a subterranean formation, wherein the PLPP comprises (i) a mosaic structure and (ii) an effective length $L_f$, wherein (a) a first proppant pack region spans across a far wellbore length $L_{ff}$ of a far wellbore region of the subterranean formation, and (b) a second proppant pack region spans across a near wellbore length $L_{fn}$ of a near wellbore region of the subterranean formation, wherein $L_{ff}$ is equal to or greater than about 35% of $L_f$, wherein $L_{fn}$ is less than about 65% of $L_f$, and wherein $L_f = L_{ff} + L_{fn}$.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 shows different regions of a particulate-laden proppant pack.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing methods comprising producing a particulate-laden proppant pack (PLPP). In an embodiment, the method of producing a PLPP comprises (I) placing in a wellbore and/or subterranean formation (a) a pad fluid (e.g., a particulate-free fluid), and allowing the creation of at least a fracture therein, (b) a first slurry fluid comprising a reducible material (e.g., a degradable polymer) and a first particulate material (e.g., a plurality of first particulate material clusters) within said fracture, and (c) in an alternating sequence within said fracture (i) a second slurry fluid comprising a second particulate material (e.g., a plurality of second particulate material clusters) and (ii) a spacer fluid (e.g., a particulate-free fluid); (II) allowing the fracture to close; and (III) allowing the fluids to break and the reducible materials to degrade, thereby forming the PLPP. In some embodiments, the first particulate material and the second particulate material are the same. In other embodiments, the first particulate material and the second particulate material are different. In some embodiments, the pad fluid and the spacer fluid are the same. In other embodiments, the pad fluid and the spacer fluid are different. In an embodiment, the method of forming a PLPP may advantageously facilitate the consolidation and/or enhancing the conductivity of at least a portion of the wellbore and/or subterranean formation. Additional methods and compositions for forming a PLPP will be described in more detail later herein.

In an embodiment, a PLPP comprises a mosaic structure. As used herein, the term "mosaic structure" refers to the non-uniform character of the particulate-laden structure, wherein different regions within the PLPP have different three dimensional configurations of features or structures. For example, a region of the PLPP (e.g., a first proppant pack region) might comprise a compact three dimensional configuration of particulate materials, while another region of the PLPP (e.g., a second proppant pack region) might comprise a more dispersed three dimensional configuration of particulate materials (e.g., particulate material pillars or proppant pillars).

In the embodiment of FIG. 1, a PLPP 100 is depicted. In an embodiment, a PLPP 100 formed in the wellbore and/or subterranean formation may extend from a second boundary 12 where a fracture 10 was initiated (e.g., a place where a perforation was present, for example a wellbore boundary surface such as an wellbore wall, surface or face) to a first boundary 11 (e.g., a terminal end of a fracture), which is the farthest point of the PLPP 100 from the second boundary 12, as seen in FIG. 1. In an embodiment, the PLPP 100 may be characterized by an effective length ($L_f$), as seen in FIG. 1. In an embodiment as shown in FIG. 1, the effective length $L_f$ may extend between the first boundary 11 (e.g., a terminal end of a fracture) and the second boundary 12 (e.g., a wellbore wall, which for example may be further supported by casing and cement disposed in an annular space between the casing and the wellbore wall).

In an embodiment, the PLPP 100 comprises a first proppant pack region 110 and a second proppant pack region 120. In an embodiment, the PLPP 100 may extend over both a near wellbore region (NWR) and a far wellbore region (FWR).

In an embodiment, the first proppant pack region 110 may extend over a FWR. In such embodiment, the first proppant pack region 110 may span across a far wellbore length ($L_{ff}$) of a FWR. For purposes of the disclosure herein, the first proppant pack region 110 may be defined as a region that extends from the first boundary 11 across a far wellbore length ($L_{ff}$), towards the second boundary 12, as seen in the embodiment of FIG. 1. In an embodiment, the $L_{ff}$ comprises equal to or greater than about 35% of the $L_f$, alternatively about 50% of the $L_f$, or alternatively about 65% of the $L_f$.

In an embodiment, the second proppant pack region 120 may extend over a NWR. In such embodiment, the second proppant pack region 120 may span across a near wellbore length ($L_{fn}$) of a NWR. For purposes of the disclosure herein, the second proppant pack region 120 may be defined as a region that extends from the second boundary 12 across a near wellbore length ($L_{fn}$), towards the first boundary 11, as seen in the embodiment of FIG. 1. In an embodiment, the $L_{fn}$ comprises less than about 65% of the $L_f$, alternatively less than about 50% of the $L_f$ or alternatively less than about 35% of the $L_f$.

In an embodiment, the PLPP 100 may be characterized by a ratio of the far wellbore length ($L_{ff}$) to the near wellbore length ($L_{fn}$) of about 0.3:1, alternatively about 1:1, or alternatively about 2:1. In an embodiment, $L_f = L_{ff} + L_{fn}$.

In an embodiment, the first proppant pack region 110 comprises a first particulate material (e.g., a low-grade particulate material, a coated low-grade particulate material, a plurality of first particulate material clusters 20, etc.) and a plurality of first flow channels 21, as seen in FIG. 1. In an embodiment, the first particulate material comprises a low-grade particulate material.

In an embodiment, a particulate material (e.g., a first particulate material, a second particulate material, etc.) comprises a coated particulate material such as a coated low-grade particulate material (e.g., coated low-grade sand) in the form of clusters (e.g., first particulate material clusters 20, second particulate material clusters, etc.). In an embodiment, the particulate material (e.g., a first particulate material, a second particulate material, etc.) comprises a particulate material cluster (e.g., first particulate material clusters 20, second particulate material clusters, etc.), wherein the particulate material is coated such that the surface of particulate material particles becomes sticky or tacky, thereby causing the particulate material particles to stick, adhere or agglomerate together into clusters. Generally, a particulate material cluster comprises two or more particulate material particles that are physically and/or chemically bonded together by means of a coating that is present on at least a portion of the surface of the particulate material particles, as will be described later herein.

In an embodiment, the first particulate material comprises a plurality of first particulate material clusters 20 further comprising a coated low-grade particulate material (e.g., a coated low grade sand).

In an embodiment, the first flow channels 21 of the first proppant pack region 110 are created by the degradation of at least a portion of the reducible material deposited in the first proppant pack region 110 by the first slurry fluid, as will be described later herein. In an embodiment, the first flow channels 21 are uniformly distributed throughout the first proppant pack region 110, owing to an uniform distribution of reducible materials throughout the first proppant pack region 110, wherein at least a portion of the reducible materials may degrade and leave the first flow channels 21 of the first proppant pack region 110. As will be appreciated by one of skill in the art, and with the help of this disclosure, once the reducible materials (e.g., degradable materials, degradable particulates) degrade, channels (e.g., first flow channels) are formed in addition to the inherent porous nature of the proppant pack (e.g., first proppant pack region). As will be appreciated by one of skill in the art, and with the help of this disclosure, while the density and/or the buoyancy of the reducible materials and the first particulate materials (e.g., coated low-grade particulate materials) or the particulate material clusters (e.g., first particulate material clusters 20) may be different, a coating of the particulate materials (e.g., tackifying agent coating, consolidating agent coating) may promote the adherence of the reducible materials to a coated particulate material (e.g., coated low-grade particulate material) or to the particulate material clusters (e.g., a first particulate material cluster), as will be described later herein, thereby leading to an uniform distribution of the reducible materials throughout the particulate materials (e.g., coated low-grade particulate materials) or the particulate material clusters, e.g., throughout the first proppant pack region.

In an embodiment, the use of a reducible material in the first slurry fluid may increase the volume of the first flow channels by from about 5% to about 50%, alternatively from about 5% to about 10%, alternatively from about 10% to about 25%, or alternatively from about 25% to about 50%, based on the volume of flow channels that would be created by the same amount of particulate material delivered in the same first proppant pack region in the absence of a reducible material.

In an embodiment, the use of a reducible material in the first slurry fluid may increase the fracture flow capacity of the first proppant pack region by from about 25% to about 200%, alternatively from about 25% to about 50%, alternatively from about 50% to about 200%, or alternatively from about 50% to about 100%, based on the fracture flow capacity of the first proppant pack region that would be created by the same amount of particulate material delivered in the same first proppant pack region in the absence of a reducible material.

In an embodiment, the second proppant pack region 120 comprises a structural arrangement of particulate material pillars 30 and second flow channels 40. In an embodiment, the particulate material pillars 30 comprise a second particulate material (e.g., a plurality of second particulate material clusters). In an embodiment, the second particulate material clusters comprise a coated particulate material such as a coated low-grade particulate material (e.g., coated low-grade sand).

In an embodiment, the second proppant pack region 120 comprises second flow channels 40 in an amount of less than about 70 vol. %, alternatively less than about 60 vol. %, alternatively less than about 50 vol. %, or alternatively less than about 40 vol. %, based on the total volume of the second proppant pack region 120.

In an embodiment, the particulate material pillars 30 are substantially free of flow spaces or channels. In an embodiment, a fluid (e.g., a natural resource fluid, such as oil) may flow around the pillars, e.g., through the second flow channel spaces 40 that surround the particulate material pillars 30 in the second proppant pack region 120. In such embodiment, the particulate material pillars 30 are substantially impervious of fluid flow and thus do not allow for a fluid to flow directly through (in contrast to around) the pillars. In an embodiment, the particulate material pillars 30 comprise flow spaces in an amount of less than about 5 vol. %, alternatively less than about 1 vol. %, alternatively less than about 0.1 vol. %, or alternatively less than about 0.01 vol. %, based on the total volume of the particulate material pillars 30.

Without wishing to be limited by theory, a proppant pillar resembles a column, and while it may be assumed to be cylindrical, it does not necessarily have a circular cross-section, e.g., a proppant pillar cross-section may be of any geometry, such as for example circular, oval, elliptical, triangular, irregular, etc. For purposes of the disclosure herein, the largest dimension of the proppant pillar cross-section will be referred to herein as the "proppant pillar width." For purposes of the disclosure herein, the height of the column described by the proppant pillar will be referred to herein as the "proppant pillar height."

In an embodiment, the use of an alternating sequence of a second slurry fluid and a spacer fluid (that is, pulsing or slugging a particulate-laden fluid or slurry, e.g., a second slurry fluid, with a "clean" or particulate-free fluid, e.g., a spacer fluid) according to the method of producing a PLPP may increase the volume of the second flow channels by from about 30% to about 60%, alternatively from about 30% to about 40%, alternatively from about 40% to about 50%, or alternatively from about 50% to about 60%, based on the volume of flow channels that would be created by the same amount of particulate material delivered in the same second proppant pack region by the second slurry fluid used in the absence of the spacer fluid, i.e., in the absence of an alternating sequence of the second slurry fluid and the spacer fluid (e.g., the particulate material is deposited in the second proppant pack region by pumping only the second slurry fluid, and no spacer fluid).

In an embodiment, the use of an alternating sequence of a second slurry fluid and a spacer fluid according to the method of producing a PLPP may increase the fracture flow capacity of the second proppant pack region by from about 25% to about 200%, alternatively from about 25% to about 50%, alternatively from about 50% to about 100%, or alternatively from about 100% to about 200%, based on the fracture flow capacity of the second proppant pack region that would be created by the same amount of particulate material delivered in the same second proppant pack region by the second slurry fluid used in the absence of the spacer fluid, i.e., in the absence of an alternating sequence of the second slurry fluid and the spacer fluid (e.g., the particulate material is deposited in the second proppant pack region by pumping only the second slurry fluid, and no spacer fluid).

In an embodiment, a method of servicing a wellbore comprises drilling a wellbore in a subterranean formation and introducing to the formation a WSF (e.g., a particulate-free fluid, a pad fluid, a spacer fluid, a particulate-laden fluid, a slurry fluid, etc.). As used herein, a "servicing fluid" or "treatment fluid" refers generally to any fluid that may be used in a subterranean application in conjunction with a desired function and/or for a desired purpose. The WSF is for use in a wellbore that penetrates a subterranean formation. It is to be understood that "subterranean formation" encompasses both areas below exposed earth and areas below earth covered by water such as ocean or fresh water.

In an embodiment, a WSF comprises a particulate-free fluid. In an embodiment, a particulate-free fluid is substantially free of particulate materials. In an embodiment, a particulate-free fluid comprises a particulate material in an amount of less than about 1 pound per gallon (ppg), alternatively less than about 0.1 ppg, alternatively less than about 0.01 ppg, alternatively less than about 0.001 ppg, or alternatively less than about 0.1 ppg, based on the total volume of the particulate-free fluid. In an embodiment, the particulate-free fluid comprises a pad fluid. In an embodiment, the particulate-free fluid comprises a spacer fluid. In some embodiments, the pad fluid and the spacer fluid are the same. In other embodiments, the pad fluid and the spacer fluid are different.

In an embodiment, a particulate-free fluid comprises an aqueous base fluid and an additive, such as for example a viscosifying agent. In an embodiment, a particulate-free fluid may further comprise a crosslinker, a breaker, or combinations thereof.

In an embodiment, a WSF comprises a particulate-laden fluid, also referred to as a slurry fluid or a pumpable slurry (e.g., a first slurry fluid, a second slurry fluid, etc.). In an embodiment, a particulate-laden fluid comprises a particulate-free fluid (e.g., similar or the same compositionally as a pad or spacer fluid) and a particulate material (e.g., a first particulate material, a second particulate material, etc.). In an embodiment, a particulate-laden fluid comprises an aqueous base fluid, and an additive, such as for example a viscosifying agent, and a particulate material. In an embodiment, a particulate-laden fluid may further comprise a crosslinker, a breaker, or combinations thereof.

Nonlimiting examples of WSFs suitable for use in the present disclosure include fracturing fluids, gravel packing fluids, pad fluids, spacer fluids, acidizing fluids.

In an embodiment, the WSF comprises an aqueous base fluid. Herein, an aqueous base fluid refers to a fluid having equal to or less than about 20 vol. %, 15 vol. %, 10 vol. %, 5 vol. %, 2 vol. %, or 1 vol. % of a non-aqueous fluid based on the total volume of the WSF. Aqueous base fluids that may be used in the WSF include any aqueous fluid suitable for use in subterranean applications, provided that the aqueous base fluid is compatible with the other ingredients/components used in the WSF (e.g., particulate materials, reducible materials, etc.). For example, the WSF may comprise water or a brine.

In an embodiment, the aqueous base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 1 wt. % to about 18 wt. %, or alternatively from about 2 wt. % to about 7 wt. %, by weight of the aqueous fluid. In an embodiment, the salt or salts in the water may be present within the base fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine. The brine may be present in an amount of from about 1 wt. % to about 10 wt. %, alternatively from about 2 wt. % to about 7 wt. %, based on the total weight of the WSF. Alternatively, the aqueous base fluid may comprise the balance of the WSF after considering the amount of the other components used.

The WSF may further comprise additional additives as deemed appropriate for improving the properties of the fluid. Such additives may vary depending on the intended use of the fluid in the wellbore. Examples of such additives include, but are not limited to viscosifying agents, viscosifiers, gelling agents, suspending agents, viscoelastic surfactants, clays, crosslinkers, coupling agents, silane coupling agents, surfactants, emulsifiers, dispersants, flocculants, pH adjusting agents, bases, acids, mutual solvents, corrosion inhibitors, relative permeability modifiers, lime, weighting agents, glass fibers, carbon fibers, conditioning agents, water softeners, foaming agents, salts, oxidation inhibitors, scale inhibitors, thinners, scavengers, gas scavengers, lubricants, friction reducers, antifoam agents, bridging agents, clay control agents, fluid loss additives, and the like, or combinations thereof. These additives may be introduced singularly or in combination using any suitable methodology and in amounts effective to produce the desired improvements in fluid properties. As will appreciated by one of skill in the art with the help of this disclosure, any of the components and/or additives used in the WSF have to be compatible with the other components used in the WSF.

In an embodiment, the WSF comprises a viscosifying agent or a viscosifier. Generally, when added to a fluid, a viscosifying agent increases the viscosity of such fluid. For example, a viscosifying agent may improve the ability of a WSF to suspend and transport a particulate material to a desired location in a wellbore and/or subterranean formation.

In an embodiment, the viscosifying agent is comprised of a naturally-occurring material. Alternatively, the viscosifying agent comprises a synthetic material. Alternatively, the viscosifying agent comprises a mixture of a naturally-occurring and synthetic material.

In an embodiment, a viscosifying agent comprises viscosifying polymers, gelling agents, polyamide resins, polycarboxylic acids, fatty acids, soaps, viscoelastic surfactants, clays, derivatives thereof, or combinations thereof. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of polymeric materials suitable for use as part of the viscosifying agent include, but are not limited to homopolymers, random, block, graft, star- and hyper-branched polyesters, copolymers thereof, derivatives thereof, or combinations thereof. The term "copolymer" as used herein is not limited to the combination of two polymers, but includes any combination of any number of polymers, e.g., graft polymers, terpolymers, and the like. The term "derivative" herein as it relates to a viscosifying agent is defined to include any compound that is made from one or more of the viscosifying agents, for example, by replacing one atom in the viscosifying agent with another atom or group of atoms, rearranging two or more atoms in the viscosifying agent, ionizing one of the viscosifying agents, or creating a salt of one of the viscosifying agents.

In an embodiment, the viscosifying agent comprises a viscosifying polymer. In an embodiment, the viscosifying polymer may be used in uncrosslinked form. In an alternative embodiment, the viscosifying polymer may be a crosslinked polymer.

Nonlimiting examples of viscosifying polymers suitable for use in the present disclosure include polysaccharides, guar, locust bean gum, Karaya gum, gum tragacanth, hydroxypropyl guar (HPG), carboxymethyl guar (CMG), carboxymethyl hydroxypropyl guar (CMHPG), hydrophobically modified guars, high-molecular weight polysaccharides composed of mannose and galactose sugars, heteropolysaccharides obtained by the fermentation of starch-derived sugars, xanthan gum, diutan, welan, gellan, scleroglucan, chitosan, dextran, substituted or unsubstituted galactomannans, starch, cellulose, cellulose ethers, carboxycelluloses, carboxymethyl cellulose (CMC), hydroxyethyl cellulose (HEC), hydroxypropyl cellulose, carboxyalkylhydroxyethyl celluloses, carboxymethyl hydroxyethyl cellulose (CM-HEC), methyl cellulose, polyacrylic acid (PAC), polyacrylate polymers, sodium polyacrylate, polyacrylamide (PAM), partially hydrolyzed polyacrylamide (PHPA), polymethacrylamide, poly(acrylamido-2-methyl-propane sulfonate), polysodium-2-acrylamide-3-propylsulfonate, polyvinyl alcohol, copolymers of acrylamide and poly(acrylamido-2-methyl-propane sulfonate), terpolymers of poly(acrylamido-2-methyl-propane sulfonate), acrylamide and vinylpyrrolidone or itaconic acid, derivatives thereof, and the like, or combinations thereof.

In an embodiment, the viscosifying agent comprises a viscoelastic surfactant. The viscosity of fluids comprising viscoelastic surfactants is generally attributed to the three-dimensional structure formed by the components of the fluid, e.g., viscoelastic surfactant molecules. When the concentration of the viscoelastic surfactant in a fluid exceeds a critical concentration, and in most cases in the presence of an electrolyte (e.g., a salt), viscoelastic surfactant molecules aggregate into three-dimensional structures, such as for example worm-like micelles, rod-like micelles, etc., which can interact to form a three-dimensional network exhibiting viscous and elastic behavior. In an embodiment, the viscoelastic surfactant comprises an anionic surfactant, a cationic surfactant, a nonionic surfactant, an amphoteric surfactant, a zwitterionic surfactant, and combinations thereof.

Nonlimiting examples of viscosifying polymers suitable for use in the present disclosure include methyl ester sulfonates, ester sulfates, sodium lauryl sulfate, hydrolyzed keratin, sulfosuccinates, laurates, polyoxyethylene (20) sorbitan monolaurate (e.g., Polysorbate 20, Tween 20), sorbates, polysorbate 60, polysorbate 65, polysorbate 80, strearates, sorbitan monostearate, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

In an embodiment, the viscosifying agent comprises a clay. Nonlimiting examples of clays suitable for use in the present disclosure include water swellable clays, bentonite, montmorillonite, attapulgite, kaolinite, metakaolin, laponite, hectorite, sepiolite, organophilic clays, amine-treated clays, and the like, or combinations thereof.

In an embodiment, the viscosifying agent comprises LGC-VI gelling agent, WG-31 gelling agent, WG-35 gelling agent, WG-36 gelling agent, GELTONE II viscosifier, TEMPERUS viscosifier, or combinations thereof. LGC-VI gelling agent is an oil suspension of a guar-based gelling agent specifically formulated for applications that require a super-concentrated slurry; WG-31, WG-35, and WG-36 gelling agents are guar-based gelling agents used as solids; GELTONE II viscosifier is an organophilic clay; and TEMPERUS viscosifier is a modified fatty acid; each of which is commercially available from Halliburton Energy Services.

In an embodiment, the viscosifying agents may be included within the WSF in a suitable amount. In an embodiment a viscosifying agent of the type disclosed herein may be present within the WSF in an amount of from about 0.01 wt. % to about 15 wt. %, alternatively from about 0.1 wt. % to about 10 wt. %, or alternatively from about 0.4 wt. % to about 5 wt. %, based on the total weight of the WSF.

In an embodiment, the WSF further comprises a crosslinker. Without wishing to be limited by theory, a crosslinker is a chemical compound or agent that enables or facilitates the formation of crosslinks, i.e., bonds that link polymeric chains to each other, with the end result of increasing the molecular weight of the polymer. When a fluid comprises a polymer (e.g., a viscosifying polymeric material), crosslinking such polymer generally leads to an increase in fluid viscosity (e.g., due to an increase in the molecular weight of the polymer), when compared to the same fluid comprising the same polymer in the same amount, but without being crosslinked. The presence of a crosslinker in a WSF comprising a viscosifying polymer may lead to a crosslinked fluid. For example, if the viscosity of the WSF comprising a viscosifying polymer is z, the viscosity of the crosslinked fluid may be at least about 2 z, alternatively about 10 z, alternatively about 20 z, alternatively about 50 z, or alternatively about 100 z. Crosslinked fluids are thought to have a three dimensional polymeric structure that is better able to support solids, such as for example particulate materials, proppants, gravels, drill cuttings, when compared to the same WSF comprising the same polymer in the same amount, but without being crosslinked.

Nonlimiting examples of crosslinkers suitable for use in the present disclosure include polyvalent metal ions, aluminum ions, zirconium ions, titanium ions, antimony ions, polyvalent metal ion complexes, aluminum complexes, zirconium complexes, titanium complexes, antimony complexes, and boron complexes, boron compounds, borate, borax, boric acid, calcium borate, magnesium borate, borate esters, polyborates, polymer bound boronic acid, polymer bound borates, and the like, or combinations thereof.

Examples of commercially available crosslinkers include without limitation BC-140 crosslinker; BC-200 crosslinker; CL-23 crosslinker; CL-24 crosslinker; CL-28M crosslinker; CL-29 crosslinker; CL-31 crosslinker; CL-36 crosslinker; K-38 crosslinker; or combinations thereof. BC-140 crosslinker is a specially formulated crosslinker/buffer system; BC-200 crosslinker is a delayed crosslinker that functions as both crosslinker and buffer; CL-23 crosslinker is a delayed crosslinking agent that is compatible with $CO_2$; CL-24 crosslinker is a zirconium-ion complex used as a delayed temperature-activated crosslinker; CL-28M crosslinker is a water-based suspension crosslinker of a borate mineral; CL-29 crosslinker is a fast acting zirconium complex; CL-31 crosslinker is a concentrated solution of non-delayed borate crosslinker; CL-36 crosslinker is a new mixed metal crosslinker; K-38 crosslinker is a borate crosslinker; all of which are available from Halliburton Energy Services.

In an embodiment, the crosslinker may be included within the WSF in a suitable amount. In an embodiment a crosslinker of the type disclosed herein may be present within the WSF in an amount of from about 10 parts per million (ppm) to about 500 ppm, alternatively from about 50 ppm to about 300 ppm, or alternatively from about 100 ppm to about 200 ppm, based on the total weight of the WSF.

In an embodiment, the WSF further comprises a breaker or a breaking agent. Generally, chemicals used to reduce the viscosity of the WSF are called breakers or breaking agents. Reducing the viscosity of the WSF is referred to as "breaking" the fluid, for example by breaking or reversing of the crosslinks between polymer molecules and/or by reducing the size of the polymer chains by chain scission of the viscosifying polymeric materials. No particular mechanism is necessarily implied by the term "breaking." As will be appreciated by one of skill in the art, and with the help of this disclosure, a breaker may be included in a servicing fluid in an amount and form sufficient to achieve the desired viscosity reduction at a desired time. For example, in an embodiment, the breaker may be formulated to provide a delayed break, and such breaker may also be referred to as time-delayed and/or time-released breaker. In some embodiments, the breaker may be encapsulated (e.g., physical encapsulation or packaging), e.g., the breaker may be coated with a porous material that allows for release of the breaker at a controlled rate; the breaker may be coated with a material (e.g., resins, polymeric materials, etc.) that will degrade when downhole, so as to release the breaker when desired; etc. In other embodiments, the breaker may be present in the form of a breaker precursor (e.g., an ester). Herein a breaker precursor is defined as a material or combination of materials that provides for delayed release of one or more breaking agent species. In another embodiment, the breaker precursor may be encapsulated. In embodiments, breaker precursors comprise a material or combination of materials that may react to generate and/or liberate a breaker after a period of time has elapsed. In embodiments, breaker precursors may be formed by modifying breakers via the addition of an operable functionality component or substituent. The operable functionality component or substituent may be acted upon in any fashion (e.g., chemically, physically, thermally, etc.) and under any conditions compatible with the components of the process in order to release the breaker at a desired time and/or under desired conditions, such as in situ wellbore conditions.

In an embodiment, a breaker may comprises an enzyme, an oxidant, a peroxide, a chelating agent, an ester, or combinations thereof.

In an embodiment, the breaker comprises xanthanase, which is an enzyme configured for the degradation of xanthan polymers. An example of a xanthanase suitable for use in the present disclosure is commercially available from Halliburton Energy Services, Inc. as a part of the N-FLOW line of service formulations.

In an embodiment, the breaker is an oxidant. Nonlimiting examples of oxidants suitable for use in the present disclosure include an oxide, a peroxide, a perborate, sodium perborate, GBW-40 breaker, SP breaker, OXOL II breaker, or combinations thereof. GBW-40 breaker is a strong oxidizer breaker, SP breaker is a water-soluble oxidizing breaker and OXOL II breaker is a delayed release oxidizing breaker, all of which are commercially available from Halliburton Energy Services, Inc.

In an embodiment, the breaker is a chelating agent. Nonlimiting examples of chelating agents suitable for use in the present disclosure include ethylenediaminetetraacetic acid, dimercaptosuccinic acid, dimercapto-propane sulfonate, α-lipoic acid, calcium disodium versenate, D-penicillamine, deferoxamine, defarasirox, dimercaprol, glutamic acid, diacetic acid, or combinations thereof.

In an embodiment, the breaker is an ester. Nonlimiting examples of esters suitable for use in the present disclosure include ethyl formate, propyl formate, butyl formate, amyl formate, anisyl formate, methyl acetate, propyl acetate, triacetin, butyl propionate, isoamyl propionate, ethyl lactate, methyl butyrate, ethyl isobutyrate, butyl isobutyrate, diethyl malonate, butyl ethyl malonate, dimethyl succinate, diethyl succinate, diethyl malate, diethyl tartrate, dimethyl tartrate, triethyl citrate, and combination thereof.

In an embodiment, the WSF further comprises a particulate material (e.g., a first particulate material, a second particulate material, etc.). In an embodiment, the particulate material comprises a proppant, a gravel, or combinations thereof. As used herein, a particulate material refers to a granular material that is suitable for use in a particulate pack (e.g., a proppant pack and/or a gravel pack). When deposited in a fracture, the particulate material may form a particulate pack (e.g., a proppant pack and/or a gravel pack) structure through which fluids may flow to the wellbore. The particulate material functions to prevent the fractures from closing due to overburden pressures.

In an embodiment, the particulate material may be comprised of a naturally-occurring material. Alternatively, the particulate material comprises a synthetic material. Alternatively, the particulate material comprises a mixture of a naturally-occurring and synthetic material.

In an embodiment, the particulate material comprises a proppant, which may form a proppant pack when placed in the wellbore and/or subterranean formation. In an embodiment, the proppant may comprise any suitable granular material, which may be used to prop fractures open, i.e., a propping agent or a proppant.

Nonlimiting examples of proppants suitable for use in this disclosure include silica (sand), desert sand, beach sand, graded sand, Ottawa sands, Brady sands, Colorado sands; resin-coated sands; dirt; soil; gravels; synthetic organic particles, nylon pellets, high density plastics, teflons, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; resin coated materials of the type described herein; or combinations thereof. In an embodiment, the proppant comprises sand. In an embodiment, the proppant comprises a low-grade sand.

In an embodiment, the particulate material comprises a gravel, which may form a gravel pack when placed in the wellbore and/or subterranean formation. A "gravel pack" is a term commonly used to refer to a volume of particulate materials (such as gravel and/or sand) placed into a wellbore to at least partially reduce the migration of unconsolidated formation particulates into the wellbore. In an embodiment, the gravel pack comprises a proppant material of the type previously described herein.

The particulate materials may be of any suitable size and/or shape. In an embodiment, a particulate material suitable for use in the present disclosure may have an average particle size in the range of from about 2 to about 400 mesh, alternatively from about 8 to about 100 mesh, or alternatively from about 10 to about 70 mesh, U.S. Sieve Series.

In an embodiment, the particulate material may be included within a servicing fluid (e.g., a first slurry fluid, a second slurry fluid) in a suitable amount. In an embodiment, the particulate material may be present within a servicing fluid (e.g., a first slurry fluid, a second slurry fluid) in an amount of from about 0.1 pounds per gallon (ppg) to about 28 ppg, alternatively from about 0.1 ppg to about 14 ppg, or alternatively from about 0.1 ppg to about 8 ppg, based on the total volume of the servicing fluid (e.g., a first slurry fluid, a second slurry fluid).

In an embodiment, a particulate material comprises a low-grade particulate material, a high-grade particulate material, or combinations thereof. For purposes of the disclosure herein, the classification of a particulate material as a "low-grade" or "high-grade" refers the guidelines of the API RP56 standards. Specifically, a particulate material that has both a roundness of equal to or greater than about 0.6 and a sphericity of equal to or greater than about 0.6 is deemed to be a "high-grade" particulate material, as outlined in the API RP56 standards. Further, a particulate material that has a roundness of less than about 0.6 and/or a sphericity of less than about 0.6 is deemed to be a "low-grade" particulate material. Roundness generally refers to the sharpness of the corners and edges of a grain/particle and it may be defined as the ratio of the average radius of curvature of the corners to the radius of the largest inscribed circle. Since it is quite time consuming to measure roundness, the common method of estimating roundness is to visually compare grains of unknown roundness with standard images of grains of known roundness. Sphericity generally measures the degree to which a particle approaches a spherical shape, and it may be defined as the ratio between the diameter of a sphere with the same volume as the particle and the diameter of the circumscribed sphere. The sphericity of a particle is usually determined by measuring the three linear dimensions of the particle: longest diameter, intermediate diameter and shortest diameter. For example, a particulate material with a roundness of 0.7 and a sphericity of 0.9 is considered a high-grade particulate material. For example, a particulate material with a roundness of 0.5 and a sphericity of 0.4 is considered a low-grade particulate material. For example, a particulate material with a roundness of 0.3 and a sphericity of 0.8 is considered a low-grade particulate material.

In an embodiment, the low-grade particulate material comprises particles having high angularity or an angular surface, i.e., a surface with sharp and/or jagged corners. Angularity and roundness are both terms used to describe the shape of the corners on a particle. The higher the angularity of a particle (e.g., angular particle), the lower the roundness of that particle. Similarly, the higher the roundness of a particle, the lower the angularity of that particle. As will be appreciated by one of skill in the art, and with the help of this disclosure, low-grade particulate materials comprise angular particles.

As will be appreciated by one of skill in the art, and with the help of this disclosure, low-grade particulate materials have a higher surface area than high-grade particulate materials, when the compared particles have the same volume. By definition, the lowest surface area for a given volume corresponds to the surface area of a sphere.

In an embodiment, the low-grade particulate materials may comprise particles with a wider range of particle size distribution, when compared to the size distribution of the high-grade particulate materials.

In an embodiment, the particulate material may comprise a coated particulate material (e.g., coated low-grade particulate material). In an embodiment, the coated particulate material (e.g., coated low-grade particulate material) comprises a particulate material (e.g., low-grade particulate material) that is coated with a coating agent. In an embodiment, the coating agent comprises a tackifying agent, a consolidating agent, or combinations thereof. In an embodiment, the coating agent may form at least a partial coating upon the surface of the particulate material (e.g., low-grade particulate material), e.g., may coat at least a portion of the surface of the particulate material (e.g., low-grade particulate material). In some embodiments, the coating agent may coat the entire surface of the particulate material (e.g., low-grade particulate material). In an embodiment, the particulate material may be coated with a coating agent on-the-fly (e.g., in real time or on-location), e.g., directly prior to pumping the particulate-laden fluid or slurry fluid (e.g., a first slurry fluid, a second slurry fluid) into the wellbore. In another embodiment, the particulate material may be coated with a coating agent ahead of the wellbore servicing operation, either at the well site or off-site. When coated off-site, the coated particulate material (e.g., a coated low-grade particulate material) may be transported to (and, if necessary, stored at) the on-site location and combined with other components to form a servicing fluid, such as for example a particulate-laden fluid or slurry fluid (e.g., a first slurry fluid, a second slurry fluid, etc.).

In an embodiment, the presence of a coating agent on a particulate material may facilitate the adherence between particulate material particles, thereby enabling the formation of particulate material clusters (e.g., first particulate material clusters, second particulate material clusters). In an embodiment, the presence of a coating agent on a particulate material may facilitate the adherence between particulate material particles and reducible material particles, and thus may lead to an uniform distribution of reducible material particles throughout the coated low-grade particulate materials or the particulate material clusters, e.g., throughout the first proppant pack region.

In an embodiment, the coating agent comprises a tackifying agent. Generally, tackifying agents or tackifiers are chemical compounds used as adhesives to increase the "tack," i.e., the stickiness of the surface of the adhesive. As used herein, the term "tacky," in all of its forms, generally refers to a substance having a nature such that it is (or may be activated to become) somewhat sticky to the touch.

Nonlimiting examples of tackifying agents suitable for use in the present invention include non-aqueous tackifying agents; aqueous tackifying agents; silyl-modified polyamides; curable resin compositions that are capable of curing to form hardened substances; and combinations thereof.

In an embodiment, the tackifying agent may comprise a compound that, when in liquid form or in a solvent solution, may form a non-hardening coating upon a particulate (e.g., a low-grade particulate material). In such embodiment, the tackifying agent comprises polyamides. Nonlimiting examples of polyamides suitable for use in the present disclosure include condensation reaction products of polyacids and a polyamine, such as for example mixtures of $C_{36}$ dibasic acids containing some trimer and higher oligomers, and also small amounts of monomer acids, that are reacted with polyamines. Other nonlimiting examples of polyacids suitable for use in the present disclosure include trimer acids, synthetic acids produced from fatty acids, maleic anhydride, acrylic acid, and the like. In other embodiments, the tackifying agent may comprise liquids and solutions of, for example, polyesters, polycarbonates and polycarbamates, natural resins such as shellac, and the like.

In an embodiment, the tackifying agents may be either used such that they form non-hardening coating, or they may be combined with a multifunctional compound capable of reacting with the tackifying agent to form a hardened coating. A "hardened coating," as used herein, means that the reaction of the tackifying agent with the multifunctional compound may result in a substantially non-flowable reaction product or coating that confers a higher compressive strength to the coated low-grade particulate material when compared to the same low-grade particulate material coated with the tackifying agent alone. In such embodiment, the tackifying agent may function similarly to a hardenable resin. Nonlimiting examples of multifunctional compounds suitable for use in the present disclosure include aldehydes (e.g., formaldehyde), dialdehydes (e.g., glutaraldehyde), hemiacetals or aldehyde releasing compounds, diacid halides, dihalides (e.g., dichlorides and dibromides), polyacid anhydrides (e.g., citric acid anhydride), epoxides, furfuraldehyde, glutaraldehyde, aldehyde condensates, and the like, and combinations thereof. In some embodiments of the present invention, the multifunctional compound may be mixed with the tackifying agent in an amount of from about 0.01 wt. % to about 50 wt. %, or alternatively from about 0.5 wt. % to about 1 wt. %, based on the weight of the tackifying agent.

In an embodiment, the tackifying agent may be used by itself. In another embodiment, the tackifying agent may be used as a solution in a suitable solvent (e.g., any solvent that is compatible with the tackifying agent and achieves the desired viscosity effect), such as for example solvents with high flash points (e.g., greater than about 125° F.), butyl-glycidyl ether, dipropylene glycol methyl ether, dipropylene glycol dimethyl ether, diethyleneglycol methyl ether, ethyleneglycol butyl ether, methanol, butyl alcohol, isopropyl alcohol, diethyleneglycol butyl ether, propylene carbonate, D-limonene, 2-butoxy ethanol, butyl acetate, furfuryl acetate, butyl lactate, dimethyl sulfoxide, dimethyl formamide, fatty acid methyl esters, and combinations thereof.

In an embodiment, the tackifying agent comprises an aqueous tackifying agent. Generally, aqueous tackifying agents are not significantly tacky when placed onto a particulate (e.g., low-grade particulate material), but are capable of being "activated" (that is destabilized, coalesced, and/or reacted) to transform the tackifying compound into a sticky, tackifying agent at a desirable time. Such activation may occur prior to, concurrent with, and/or subsequent to the aqueous tackifying agent being placed in/introduced to the subterranean formation. In some embodiments, a pretreatment may be first contacted with the surface of a particulate (e.g., low-grade particulate material) to prepare it to be coated with an aqueous tackifying agent. In an embodiment, aqueous tackifying agents may comprise charged polymers.

Nonlimiting examples of aqueous tackifying agents suitable for use in the present disclosure include acrylic acid polymers, acrylic acid ester polymers, acrylic acid derivative polymers, acrylic acid homopolymers, acrylic acid ester homopolymers (e.g., poly(methyl acrylate), poly (butyl acrylate), poly(2-ethylhexyl acrylate)), acrylic acid ester co-polymers, methacrylic acid derivative polymers, methacrylic acid homopolymers, methacrylic acid ester homopolymers (e.g., poly(methyl methacrylate), poly(butyl methacrylate), poly(2-ethylhexyl methacryate)), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, and combinations thereof.

In an embodiment, the tackifying agent comprises a silyl-modified polyamide. Silyl-modified polyamides may be described as substantially self-hardening compositions that are capable of at least partially adhering to particulates (e.g., low-grade particulate material) in the unhardened state, and that are further capable of self-hardening themselves. In such embodiment, the silyl-modified polyamides may comprise the reaction product of a silating compound with a polyamide or a mixture of polyamides. The polyamide or mixture of polyamides may be one or more polyamide intermediate compounds obtained, for example, from the condensation reaction of a polyacid (e.g., diacid or higher) with a polyamine (e.g., diamine or higher) to form a polyamide polymer.

In an embodiment, the coating agent comprises a consolidating agent. As used herein, consolidating agents refer to resin materials. As used herein, the term "resin material" refers to any of a number of physically similar polymerized synthetics or chemically modified natural resins including thermoplastic materials and thermosetting materials. In an embodiment, the resin material comprises any suitable resin. For example, the resin material may comprise a liquid-hardenable resin. In an embodiment, the liquid-hardenable resin comprises a hardenable resin and an optional resin solvent.

In an embodiment, the liquid-hardenable resin comprises a hardenable resin. Nonlimiting examples of hardenable resins suitable for use in this disclosure include organic resins, epoxy-based resins, polyepoxide resins, cycloaliphatic epoxides, bis(3,4-epoxycyclohexylmethyl) oxalate, bis(3,4-epoxycyclohexylmethyl) adipate, bis(3,4-epoxy-6-methylcyclohexylmethyl) adipate, bis(3,4-epoxycyclohexylmethyl) pimelate, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy) cyclohexane-meta-dioxane, glycidyl epoxides, aliphatic epoxides, epoxy cresol novolac resins, epoxy phenol novolac resins, polynuclear phenol glycidyl ether-derived resins, aromatic glycidyl amine resins, heterocyclic glycidyl amine resins, hydantoin epoxy resins, natural oils epoxides, soybean oil epoxides, linseed oil epoxides, glycidyl ether resins, bisphenol A diglycidyl ether resin, butoxymethyl butyl glycidyl ether resin, bisphenol A-epichlorohydrin resin, bisphenol F resin, bisphenol epoxy resin, phenolic resins, phenolic/latex resins, terpolymers of phenol, phenol-aldehyde resins, novolac resins, phenolic formaldehyde resin, urea-aldehyde resin, urea-formaldehyde resin, melamine-formaldehyde resin, furan resins, furan/formaldehydyde resin, furfuryl alcohol resins, furfuryl alchohol/formaldehyde resin, phenol/phenol formaldehyde/furfuryl alcohol resin, bisphenol A epoxide, polyester resins, urethane resins, and the like, or combinations thereof.

In an embodiment, the hardenable resin may be included in the liquid-hardenable resin in any suitable amount. In an embodiment, a hardenable resin of the type disclosed herein may be present in the liquid-hardenable resin in an amount of from about 5 wt. % to about 100 wt. %, alternatively from about 15 wt. % to about 85 wt. %, or alternatively from about 25 wt. % to about 55 wt. %, based on the weight of the liquid-hardenable resin component.

In an embodiment, the liquid-hardenable resin further comprises a resin solvent. The use of a resin solvent in the liquid-hardenable resin is optional, but may be desirable to reduce the viscosity of the hardenable resin for ease of handling, mixing, and transferring. It is within the ability of one skilled in the art with the benefit of this disclosure to determine if and how much resin solvent may be needed to achieve a viscosity to meet some user and/or process goal. In an alternative embodiment, the hardenable resin may be heated to reduce its viscosity.

In an embodiment, any solvent (e.g., resin solvent) that is compatible with the hardenable resin and achieves the desired viscosity may be suitable for use in the liquid-hardenable resin. Selection of an appropriate resin solvent is dependent on the resin composition chosen and is within the ability of one skilled in the art with the benefit of this disclosure.

Nonlimiting examples of resin solvents suitable for use in this disclosure include aqueous dissolvable solvents, methanol, isopropanol, butanol, butyl lactate, butyl acetate, glycol ether solvents, dipropylene glycol methyl ether, dipropylene glycol dimethyl ether, diethylene glycol methyl ether, ethyleneglycol butyl ether, diethyleneglycol butyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, dimethyl formamide, propylene carbonate, D-limonene, furfuryl acetate, tetrahydrofurfuryl methacrylate, tetrahydrofurfuryl acrylate, esters of oxalic, maleic and succinic acids, fatty acid methyl esters, butylglycidyl ether, isomers thereof, and the like, or combinations thereof.

In an embodiment, the resin solvent may be included in the liquid-hardenable resin in any suitable amount. In an embodiment, a resin solvent of the type disclosed herein may be present in the liquid-hardenable resin in an amount of from about 0.1 wt. % to about 80 wt. %, alternatively from about 1 wt. % to about 50 wt. %, or alternatively from about 5 wt. % to about 30 wt. %, based on the weight of the liquid-hardenable resin.

In an embodiment, the resin material may further comprise a liquid hardening agent. In an embodiment, the liquid hardening agent comprises a hardening agent, a silane coupling agent, a surfactant, an optional hydrolyzable ester, and an optional liquid carrier fluid.

Nonlimiting examples of hardening agents suitable for use in the liquid hardening agent in the present disclosure include piperazine, derivatives of piperazine (e.g., aminoethylpiperazine), 2H-pyrrole, pyrrole, imidazole, pyrazole, pyridine, N,N-dimethylaminopyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, triethylamine, benzyldimethylamine, tris(dimethylaminomethyl) phenol, 2-(N$_2$N-dimethylaminomethyl)phenol, cyclo-aliphatic amines, amides, polyamides, 2-ethyl-4-methyl imidazole, 1,1,3-trichlorotrifluoroacetone, 4,4'-diaminodiphenyl sulfone, and combinations thereof. Selection of a hardening agent depends, in part, on the temperature of the formation in which the hardening agent will be used, as the choice of the hardening agent often effects the range of temperatures over which a resin material is able to cure. Nonlimiting examples of hardening agents suitable for use in subterranean formations having a temperature from about 60° F. to about 250° F. include amines and cyclo-aliphatic amines such as piperidine, triethylamine, N,N-dimethylaminopyridine, benzyldimethylamine, tris(dimethylaminomethyl)phenol, and 2-(N$_2$N-dimethylaminomethyl)phenol. In an embodiment, the hardening agent comprises N,N-dimethylaminopyridine. Nonlimiting examples of hardening agents suitable for use in subterranean formations having a temperature from about 70° F. to about 350° F. include piperazine, derivatives of piperazine, aminoethylpiperazine, or combinations thereof. In subterranean formations having higher temperatures, (i.e., greater than about 300° F.) 4,4'-diaminodiphenyl sulfone may be a suitable hardening agent. The hardening agent used may be included in the liquid hardening agent in an amount sufficient to consolidate the hardenable resin, thereby consolidating the particulate materials. In an embodiment, a hardening agent of the type disclosed herein may be present in the liquid hardening agent in an amount of from about 5 wt. % to about 95 wt. %, alternatively from about 15 wt. % to about 85 wt. %, or alternatively from about 25 wt. % to about 55 wt. %, based on the weight of the liquid hardening agent.

The silane coupling agent may be used inter allia as a mediator to help bond the resin material to particulate materials. In an embodiment, the silane coupling agent is a multifunctional compound comprising two or more reactive moieties that can form covalent bonds with other molecules. Alternatively, in an embodiment, the silane coupling agent is a bifunctional compound comprising two reactive moieties that can form covalent bonds with other molecules. In an embodiment, a silane coupling agent suitable for use in the present disclosure is able to covalently bond to both a substrate surface (e.g., a surface of a particulate material) and to a resin or resin material.

In an embodiment, the silane coupling agent comprises silanes, vinyl silanes, epoxy silanes, amino silanes, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

Nonlimiting examples of vinyl silanes suitable for use in the present disclosure include vinyl silane, vinyltrichlorosilane, vinyltrimethoxysilane, vinyltriethoxysilane, vinyltris (2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi (5-caprolactam)silane, bis(methyldichlorosilyl)ethane, 2,4, 6,8-tetramethyl-2,4,6,8-tetravinyl-cyclotetrasiloxane, 1,3,5-trivinyl-1,3,5-trimethylcyclotrisiloxane or combinations thereof.

Nonlimiting examples of epoxy silanes suitable for use in the present disclosure include 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, or combinations thereof.

Nonlimiting examples of amino silanes suitable for use in the present disclosure include N-(3-triethoxysilylpropyl) amine, 3-aminopropylsilanetriol, bis [(3-triethoxysily)propyl]amine, N-(3-trimethoxysilylpropyl)amine, bis [(3-trimethoxysily)propyl]amine, N-(3-methyldimethoxysilylpropyl)amine, 3-methyldimethoxysilylpropylamine, N-(2-aminoethyl)-3-aminopropyltrimethoxy-silane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)aniline, diethylaminomethyltriethoxysilane, diethylaminomethylmethyldiethoxysilane, 3-(trimethoxysilylpropyl)diethylamine, 3-(N,N-dimethylaminopropyl)-amino-propyl-methyldimethoxysilane, or combinations thereof.

The silane coupling agent used may be included in the liquid hardening agent component in an amount capable of sufficiently bonding the resin material to the particulate material. In an embodiment, a silane coupling agent of the type disclosed herein may be present in the liquid hardening agent in an amount of from about 0.01 wt. % to about 10 wt. %, alternatively from about 0.1 wt. % to about 5 wt. %, or alternatively from about 0.1 wt. % to about 3 wt. %, based on the weight of the liquid hardening agent.

Nonlimiting examples of surfactants suitable for use in the liquid hardening agent in the present disclosure include nonylphenylethoxylates with less than 5 moles of ethylene oxide, fatty acids and their salts, sorbitan trioleate, sorbitan monopalmitate, sorbitan monostearate, propylene glycol monolaurate, propylene glycol monostearate, sorbitan distearate, or combinations thereof.

The hydrolysable ester may be used in the liquid hardening agent inter allia for breaking any gel films that might form on the particulate materials. Nonlimiting examples of hydrolyzable esters suitable for use in the present disclosure include butyl acetate, furfuryl acetate, esters of organic acids such as maleic acid, fumaric acid, esters of inorganic acids such as phosphoric acid or sulfonic acid, and combinations thereof.

The liquid carrier fluid may be used in the liquid hardening agent inter allia for reducing the viscosity of the hardening agent. Nonlimiting examples of liquid carrier fluids suitable for use in the present disclosure include alkyl acetates such as butyl acetate, 2-butoxy ethanol, and combinations thereof.

In an embodiment, the coating agent comprises one or more components of EXPEDITE proppant flowback control, SANDWEDGE conductivity enhancement system or combinations thereof. EXPEDITE proppant flowback control is a proppant coating system and SANDWEDGE conductivity enhancement system is a proppant pack conductivity enhancer, each of which is commercially available from Halliburton Energy Services, Inc.

In an embodiment, the coating agent may be added to the particulate material in any suitable amount. In an embodiment, a coating agent of the type disclosed herein may be present on the particulate material in an amount of from about 0.1 wt. % to about 10 wt. %, alternatively from about 1 wt. % to about 5 wt. %, or alternatively from about 2 wt. % to about 3 wt. %, based on the total weight of the particulate material.

In an embodiment, the method of producing a PLPP comprises placing in the wellbore and/or subterranean formation a pad fluid and allowing the creation of at least a fracture therein. In such embodiment, the fracture may be of the type depicted in the embodiment of FIG. 1, wherein a fracture 10 may span across a length $L_f$. Generally, a pad fluid is a fluid used to initiate hydraulic fracturing that does not contain a particulate material, e.g., a particulate-free fluid. For example, a pad fluid may refer to the fluid pumped in a first stage of a multi-stage fracturing job.

In an embodiment, the method of producing a PLPP further comprises placing in the wellbore and/or subterranean formation a first slurry fluid, thereby extending the fracture length and/or forming the first proppant pack region in the FWR. In an embodiment, the first slurry fluid is a particulate-laden fluid, wherein the particulate-laden fluid comprises a first particulate material (e.g., a low-grade particulate material; a coated low-grade particulate material such as a coated low-grade sand in the form of clusters, for example first particulate material clusters) and a reducible material. In such embodiment, the placing of the first slurry fluid in the wellbore and/or subterranean formation may form a first proppant pack region 110 that may span across a far wellbore length $L_{ff}$, as seen in the embodiment of FIG. 1.

In an embodiment, the method of producing a PLPP further comprises placing in the wellbore and/or subterranean formation a second slurry fluid and a spacer fluid in an alternating sequence, as will be described later herein, thereby forming the second proppant pack region in the NWR. In an embodiment, the second slurry fluid is a particulate-laden fluid, wherein the particulate-laden fluid comprises a second particulate material (e.g., a low-grade particulate material such as a coated low-grade sand in the form of clusters, for example second particulate material clusters). In such embodiment, the placing in the wellbore and/or subterranean formation of a second slurry fluid and a spacer fluid in an alternating sequence may form a second proppant pack region 120 that may span across a near wellbore length $L_{fn}$, as seen in the embodiment of FIG. 1. In an embodiment, the use of an alternating sequence of a particulate-laden fluid (e.g., a second slurry fluid) and a spacer fluid may result in the formation of proppant-free channels (e.g., second flow channels) surrounding pillars of solids (e.g., particulate material pillars). Generally, a spacer fluid refers to any fluid used to physically separate one special-purpose fluid from another (e.g., a portion of a second slurry fluid from another portion of a second slurry fluid), and as such the spacer fluid has to be compatible with the special-purpose fluids (e.g., a second slurry fluid) that it separate. In an embodiment, the spacer fluid is a particulate-free fluid. In an embodiment, the spacer fluid is compositionally substantially similar to or the same as the pad fluid.

In an embodiment, the method of forming a PLPP is part of a fracturing operation, such as for example hydraulic fracturing and/or frac-packing. In an embodiment, the method of forming a PLPP comprises the step of placing a pad fluid in the wellbore and/or subterranean formation and allowing the creation of at least a fracture therein. In such embodiment, the pad fluid may comprise a fracturing fluid. As will be understood by one of ordinary skill in the art, the particular composition of a fracturing fluid will be dependent on the type of formation that is to be fractured. Fracturing fluids typically comprise an aqueous fluid (e.g., water), a surfactant, acid, friction reducers, viscosifying agents, crosslinkers, breakers, scale inhibitors, pH-adjusting agents, oxygen scavengers, iron-control agents, corrosion inhibitors, bactericides, and the like.

In an embodiment, the pad fluid may be injected into a perforated interval at a rate and a pressure sufficient to create at least one fracture in the wellbore and/or subterranean formation. In an embodiment, the perforated interval may comprise one or more perforations and/or perforation clusters (e.g., a plurality of associated or closely-positioned perforations). As may be appreciated by one of skill in the art upon viewing this disclosure, perforations generally refer to openings extending through the walls of a casing and/or liner, through a cement sheath surrounding the casing and/or liner, and, in some embodiments, into the subterranean formation. In an embodiment, forming perforations may occur by any suitable method or apparatus. For example, in an embodiment, the perforations may be formed by a fluid jetting apparatus (e.g., a hydrajetting tool). In an alternative embodiment, the perforations may be formed by the operation of a perforating gun. Such a perforating gun may be configured to selectively detonate one or more explosive charges and thereby penetrating the walls of a casing or liner and/or cement and so as to create the perforation. A suitable perforating gun may be conveyed into position within the wellbore via a workstring (e.g., a coiled tubing string), a wireline, a tractor, by any other suitable means of conveyance, as will be appreciated by one of skill in the art viewing this disclosure. In such an embodiment, the perforating gun may be lowered into the wellbore, for example, suspended from a workstring or a wireline, and actuated (e.g., fired) to form perforations. In still another embodiment, a casing string and/or liner may be perforated prior to placement within a wellbore.

In an embodiment, the pad fluid may be injected into the perforated interval at a rate such that the pad fluid (e.g., a particulate-free fluid) may initiate and/or extend a fracture within the wellbore and/or subterranean formation. For example, in an embodiment, the injection rate at which the pad fluid is provided may equal and/or exceed the rate at which the pad fluid is lost to the subterranean formation. Additionally, in an embodiment, the injection rate at which the pad fluid is provided may be sufficient to result in an increase in the pressure of the pad fluid within the wellbore, for example, so as to meet and/or exceed a fracture initiation pressure or a fracture extension pressure in at least one perforated interval. As used herein, the term "fracture initiation pressure" may refer to the hydraulic pressure which may cause a fracture to form within a portion of a subterranean formation and the term "fracture extension pressure" may refer to the amount of hydraulic pressure which will cause a fracture within a subterranean formation to be further extended within that subterranean formation.

In an embodiment, the method of forming a PLPP further comprises the step of placing a first slurry fluid in the wellbore and/or subterranean formation, thereby extending the fracture length and forming the first proppant pack region. In an embodiment, the first slurry fluid may deposit a first particulate material into the first proppant pack region. In an embodiment, the first particulate material comprises a plurality of first particulate material clusters.

In an embodiment, the first slurry fluid comprises an aqueous base fluid, a viscosifying agent, a reducible material, and a first particulate material (e.g., a plurality of first particulate material clusters). In an embodiment, the first slurry fluid may further comprise a crosslinker, a breaker, or combinations thereof. In an embodiment, the first slurry fluid comprises the pad fluid further comprising a first particulate material (e.g., a plurality of first particulate material clusters) and a reducible material.

In an embodiment, the first slurry fluid comprises a first particulate material. In an embodiment, the first particulate material comprises a coated particulate material (e.g., a coated low-grade particulate material) such as coated sand (e.g., coated low-grade sand) that may be in the form of first particulate material clusters. In an embodiment, a first particulate material cluster comprises a coated particulate material (e.g., a coated low-grade particulate material).

In an embodiment, the first slurry fluid comprises a reducible material. As used herein, a "reducible material" refers to any material that may undergo a size reduction under conditions that may be naturally encountered and/or artificially created in a wellbore environment.

In an embodiment, the reducible material may be mixed with the first particulate material (e.g., first particulate material clusters comprising the coated low-grade particulate material) prior to being introduced to the first slurry fluid. In another embodiment, the reducible material may be added to the first slurry fluid prior to, concurrent with, and/or subsequent to the first particulate material (e.g., first particulate material clusters comprising the coated low-grade particulate material) being introduced to the first slurry fluid.

In an embodiment, the reducible material may be comprised of a naturally-occurring material. Alternatively, the reducible material comprises a synthetic material. Alternatively, the reducible material comprises a mixture of a naturally-occurring and synthetic material.

In various embodiments, the reducible material may comprise a frangible material, an erodible material, a dissolvable material, a consumable material, a thermally degradable material, a meltable material, a boilable material, a degradable material (including biodegradable materials), an ablatable material, or combinations thereof. Designation of a particular reducible material as dissolvable, meltable, etc., is non-limiting and non-exclusive, and the same material may have more than one designation (e.g., various materials may overlap designations). In one embodiment, the reducible material may be effective to increase the rate of such a size reduction after the reducible material experiences a phase change.

In various embodiments, a reducible material comprises two or more different materials (e.g., two different dissolvable materials; a dissolvable material and a biodegradable material, etc.). By combining multiple distinct reducible materials, the recovery, relocation, and/or consumption of the reducible material may be further improved by expanding the options available to an operator to reduce the size of the reducible material. In instances where the necessary wellbore conditions are not available to enable size reduction of a reducible material via the size-reduction mechanism of one reducible material, size reduction may still be achieved if conditions are sufficient to enable the size-reduction mechanism of another reducible material.

In various embodiments, the reducible material may comprise any suitable material. Nonlimiting examples of reducible materials suitable for use in the present disclosure include degradable polymers, polymeric materials, hardened plastics, rubbers (e.g., oil-soluble elastomers), derivatives thereof, or combinations thereof. The term "derivative" herein as it refers to reducible materials is defined to include any compound that is made from one or more of the reducible materials, for example, by replacing one atom in the reducible material with another atom or group of atoms, rearranging two or more atoms in the reducible material, ionizing one of the reducible materials, or creating a salt of one of the reducible materials.

In various embodiments, the reducible material may comprise a dissolvable material (e.g., dissolvable reducible material). The dissolvable material may comprise an oil-soluble material, a water-soluble material, an acid-soluble material, or a combination thereof. As used herein, the term "oil-soluble" refers to a material capable of dissolving when exposed to an oleaginous fluid (e.g., oil) under downhole conditions. Suitable oil-soluble materials include, but are not limited to, oil-soluble polymers, oil-soluble resins, oil-soluble elastomers, oil-soluble rubbers, (e.g., latex), polyethylenes, polypropylenes, polystyrenes, carbonic acids, amines, waxes, copolymers thereof, derivatives thereof, or combinations thereof. As used herein, the term "water-soluble" refers to a material capable of dissolving when exposed to an aqueous wellbore fluid under downhole conditions. Suitable water-soluble materials include, but are not limited to, water-soluble polymers, water-soluble elastomers, carbonic acids, salts, amines, and inorganic salts. As used herein, the term "acid-soluble" refers to a material capable of dissolving when exposed to an acidic wellbore fluid (e.g., an acidizing fluid, aqueous acid solution, etc.)

under downhole conditions. Nonlimiting examples of inorganic salts suitable for use as reducible materials in the present disclosure include NaCl, KCl, NaBr, $CaCl_2$, $CaBr_2$, $ZnBr_2$, ammonium chloride ($NH_4Cl$), potassium phosphate, or combinations thereof.

In various embodiments, the reducible material may comprise a meltable material (e.g., meltable reducible material). As used herein, a "meltable material" refers to a material that melts under one or more downhole conditions. Examples of meltable materials that can be melted at downhole conditions include, but are not limited to, hydrocarbons having greater than or equal to about 30 carbon atoms; polycaprolactones; paraffins and waxes; carboxylic acids, such as benzoic acid, and carboxylic acid derivatives.

In some embodiments, the meltable material comprises an eutectic material (e.g., eutectic alloy). The eutectic alloy remains in a solid state at ambient surface temperatures. Eutectic materials (e.g., eutectic alloys) are characterized by forming very regular crystalline molecular lattices in the solid phase. Eutectic materials (e.g., eutectic alloys) are chemical compounds that have the physical characteristic of changing phase (melting or solidifying) at varying temperatures: melting at one temperature and solidifying at another. The temperature range between which the melting or solidification occurs is dependent on the composition of the eutectic material. When two or more of these materials are combined, the eutectic melting point is lower than the melting temperature of any of the composite compounds. The composite material may be approximately twice as dense as water, weighing approximately 120 pounds per cubic foot. In an embodiment, the eutectic material comprises a salt-based eutectic material, a metal-based eutectic material, or a combination thereof. Salt-based eutectic materials can be formulated to function at temperatures as low as about 30° F., and as high as about 1100° F. Metal-based eutectic materials can operate at temperatures exceeding about 1900° F. Nonlimiting examples suitable for use as eutectic materials (e.g., eutectic metal alloys or eutectic metallic alloys), include alloys of tin, bismuth, indium, lead, cadmium, or combinations thereof.

When a solid eutectic material is heated to the fusion (melting) point, it changes phase to a liquid state. As the eutectic material melts, it absorbs latent heat. When the temperature of the eutectic liquid solution phase is lowered to below the melting point, it does not solidify, but becomes a "super-cooled" liquid. The temperature must be lowered to the eutectic point (e.g., eutectic temperature) before it will change phase back to a solid. When the temperature is lowered to the eutectic point (e.g., eutectic temperature), the liquid-to-solid phase change occurs almost instantaneously, and forms a homogenous crystalline solid with significant mechanical strength.

The phase change from liquid to solid can also be triggered by inducing the initiation of the crystalline process. This may be accomplished by introducing free electrons into the liquid by various means, such as for example, by deformation of a piece of electrically conductive metal.

Phase-changing salts are extremely stable. If they are not heated above their maximum operating temperature range, it is believed that they may operate indefinitely. At least some eutectic salts are environmentally safe, non-corrosive, and water-soluble. Moreover, as the working-temperature range of the eutectic salt may increase, the strength of the crystal lattice may increase and the physical hardness of the solid phase may increase as well.

Eutectic materials suitable for use in the reducible materials described herein include, but are not limited to, eutectic materials capable of melting at temperatures and pressures that may be encountered in the wellbore environment. A suitable eutectic material (e.g., eutectic salt) would be, for example, an eutectic salt that melts above about 200° C. and solidifies at about 160° C. Examples of eutectic material (e.g., eutectic salt) compositions suitable for use in the reducible materials disclosed herein include, but are not limited to, mixtures of NaCl, KCl, $CaCl_2$, $KNO_3$ and $NaNO_3$. In a non-limiting exemplary embodiment, a reducible material comprises a high temperature draw salt such as 430 PARKETTES (Heatbath Corporation).

In various embodiments, the reducible material may comprise a consumable material (e.g., consumable reducible material) that is at least partially consumed when exposed to heat and a source of oxygen. If the consumable reducible material is burned and/or consumed due to exposure to heat and oxygen, the wellbore servicing foam comprising the consumable reducible material may lose structural integrity and crumble under the application of a relatively small external load and/or internal stress. In an embodiment, such load may be applied to the wellbore and controlled in such a manner so as to cause structural failure of the reducible material.

The consumable reducible material may comprise a metal material, a thermoplastic material (e.g., consumable thermoplastic material), a phenolic material, a composite material, or combinations thereof. The consumable thermoplastic material may comprise polyalphaolefins, polyaryletherketones, polybutenes, nylons or polyamides, polycarbonates, thermoplastic polyesters, styrenic copolymers, thermoplastic elastomers, aromatic polyamides, cellulosic materials, ethylene vinyl acetate, fluoroplastics, polyacetals, polyethylenes, polypropylenes, polymethylpentene, polyphenylene oxide, polystyrene, polytetrafluoroethylene (e.g., TEFLON by DuPont), or combinations thereof. In an embodiment, the consumable reducible material comprises magnesium, which is converted to magnesium oxide when exposed to heat and a source of oxygen, as illustrated by the chemical reaction (1) below:

$$3Mg+Al_2O_3 \rightarrow 3MgO+2Al \qquad (1)$$

In various embodiments, a reducible material comprising a consumable reducible material may further comprise a fuel load. The fuel load may be formed from materials that, when ignited and burned, produce heat and an oxygen source, which in turn may act as the catalysts for initiating burning of consumable components of the reducible material. The fuel load may comprise a flammable, non-explosive solid. A non-limiting example of a suitable fuel load is thermite. In one embodiment, a composition of thermite comprises iron oxide, or rust ($Fe_2O_3$), and aluminum metal power (Al). When ignited and burned, thermite reacts to produce aluminum oxide ($Al_2O_3$) and liquid iron (Fe), which is a molten plasma-like substance. The chemical reaction (2) is illustrated below:

$$Fe_2O_3+2Al_{(s)} \rightarrow Al_2O_{3(s)}+2Fe \qquad (2)$$

The reducible material comprising a consumable material may also be used in conjunction with a firing mechanism, such as an electronic igniter, with a heat source to ignite the fuel load and a device to activate the heat source. In an embodiment, the reducible material comprises a consumable material (e.g., magnesium) and a fuel source configured to initiate burning of the magnesium. In such embodiment, an igniter may be configured to ignite the fuel source. In an embodiment, the reducible material comprises magnesium and a thermite fuel source configured to initiate burning of the magnesium. In such embodiment, an electronic igniter may be configured to ignite the thermite fuel source. Upon ignition of the fuel source by the electronic igniter, the thermite forms a high-temperature plasma which causes the magnesium to react with oxygen and form a magnesium oxide slag.

In various embodiments, the reducible material may comprise a degradable material (e.g., degradable reducible material). As used herein, the term "degradable material" refers to materials that readily and irreversibly undergo a significant change in chemical structure under specific environmental conditions that result in the loss of some properties. For example, the degradable material may undergo hydrolytic degradation that ranges from the relatively extreme cases of heterogeneous (or bulk erosion) to homogeneous (or surface erosion), and any stage of degradation in between. In some embodiments, the degradable materials are degraded under defined conditions (e.g., as a function of time, exposure to chemical agents, etc.) to such an extent that the degradable materials are structurally compromised. In an alternative embodiment, the degradable materials can be degraded under defined conditions to such an extent that the degradable material no longer maintains its original form and is transformed from a degradable material having defined structural features to a plurality of masses lacking such structural features.

In an embodiment, the degradable material may be further characterized by possessing physical and/or mechanical properties that are compatible with its intended use in a wellbore servicing operation. In choosing the appropriate degradable material, one may consider the degradation products that will result. Also, one may select a degradable material having degradation products that do not adversely affect other wellbore servicing operations or any components thereof. One of ordinary skill in the art, with the benefit of this disclosure, will be able to recognize which degradable materials would produce degradation products that would adversely affect other wellbore servicing operations or any components thereof.

In some embodiments, the degradable reducible material comprises a degradable polymer. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. The degradable polymer may be chemically modified (e.g., chemical functionalization) in order to adjust the rate at which these materials degrade. Such adjustments may be made by one of ordinary skill in the art with the benefits of this disclosure. Further, the environment to which the polymer is subjected may affect how it degrades, e.g., temperature, presence of moisture, oxygen, microorganisms, enzymes, pH, and the like.

Examples of degradable polymers suitable for use in this disclosure include, but are not limited to, homopolymers, random, block, graft, and star- and hyper-branched aliphatic polyesters. In an embodiment, the degradable polymer comprises polysaccharides; lignosulfonates; chitins; chitosans; proteins; proteinous materials; fatty alcohols; fatty esters; fatty acid salts; orthoesters; aliphatic polyesters; poly(lactides); poly(glycolides); poly(ε-caprolactones); polyoxymethylene; polyurethanes; poly(hydroxybutyrate); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhdroxyalkanoates; polyethyleneterephthalates; polybutyleneterephthalates; polyethylenenaphthalenates; and copolymers, blends, derivatives, or combinations thereof. Such degradable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. In an embodiment, the degradable material comprises BIOFOAM. BIOFOAM is a biodegradable plant-based foam commercially available from Synbra.

In some embodiments, one or more reducible materials are also comprised of a biodegradable material. As used herein, "biodegradable materials" refer to materials comprised of organic components that degrade over a relatively short period of time. Typically such materials are obtained from renewable raw materials. In some embodiments, the reducible material comprises a biodegradable polymer comprising aliphatic polyesters, polyanhydrides, or combinations thereof.

In some embodiments, one or more reducible materials are also comprised of a biodegradable polymer comprising an aliphatic polyester. Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

In an embodiment, the degradable polymer comprises solid cyclic dimers, or solid polymers of organic acids. Alternatively, the degradable polymer comprises substituted or unsubstituted lactides, glycolides, polylactic acid (PLA), polyglycolic acid (PGA), copolymers of PLA and PGA, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or combinations thereof.

In an embodiment, the degradable polymer comprises an aliphatic polyester which may be represented by the general formula of repeating units shown in Formula I:

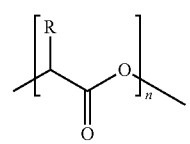

Formula I where n is an integer between 75 and 10,000 and R is selected from the group consisting of hydrogen, alkyl, aryl, alkylaryl, acetyl, heteroatoms, and mixtures thereof. In some embodiments, the aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to Formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide suitable for use in the present disclosure may be represented by general Formula II:

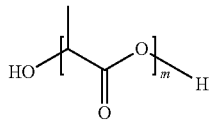

Formula II where m is an integer 2≤m≤75, alternatively, m is an integer and 2≤m≤10. These limits correspond to number average molecular weights below about 5,400 g/mole and below about 720 g/mole, respectively.

In some embodiments, the aliphatic polyester comprises poly(lactic acid). D-lactide is a dilactone, or cyclic dimer, of D-lactic acid. Similarly, L-lactide is a cyclic dimer of L-lactic acid. Meso D,L-lactide is a cyclic dimer of D-, and L-lactic acid. Racemic D,L-lactide comprises a 50/50 mixture of D-, and L-lactide. When used alone herein, the term "D,L-lactide" is intended to include meso D,L-lactide or racemic D,L-lactide. Poly(lactic acid) may be prepared from one or more of the above. The chirality of the lactide units provides a means to adjust degradation rates as well as physical and mechanical properties. Poly(L-lactide), for instance, is a semicrystalline polymer with a relatively slow hydrolysis rate. This may be advantageous for downhole operations where slow degradation may be appropriate. Poly(D,L-lactide) is an amorphous polymer with a faster hydrolysis rate. This may be advantageous for downhole operations where a more rapid degradation may be appropriate.

The stereoisomers of lactic acid may be used individually or combined in accordance with the present disclosure. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending, copolymerizing or otherwise mixing high and low molecular weight polylactides; or by blending, copolymerizing or otherwise mixing a polylactide with another polyester or polyesters.

The aliphatic polyesters may be prepared by substantially any of the conventionally known manufacturing methods such as those described in U.S. Pat. Nos. 6,323,307; 5,216,050; 4,387,769; 3,912,692; and 2,703,316, the relevant disclosure of which are incorporated herein by reference.

In some embodiments, the biodegradable polymer comprises a plasticizer. Suitable plasticizers include but are not limited to derivatives of oligomeric lactic acid, selected from the group defined by Formula III:

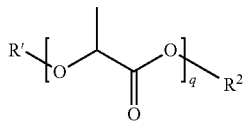

Formula III where $R^2$ is a hydrogen, alkyl, aryl, alkylaryl, acetyl, heteroatom, or a mixture thereof and $R^2$ is saturated, where R' is a hydrogen, alkyl, aryl, alkylaryl, acetyl, heteroatom, or a mixture thereof, and R' is saturated, where $R^2$ and R' cannot both be hydrogen, where q is an integer 2≤q≤75, alternatively, q is an integer and 2≤q≤10; and mixtures thereof. As used herein the term "derivatives of oligomeric lactic acid" includes derivatives of oligomeric lactide.

The plasticizers may be present in any amount that provides the desired characteristics. For example, the various types of plasticizers discussed herein provide for (a) more effective compatibilization of the melt blend components used in forming a reducible material; (b) improved processing characteristics during the blending and processing steps in forming a reducible material; and (c) control and regulate the sensitivity and degradation of the polymer by moisture when forming a reducible material. For pliability, a plasticizer is present in higher amounts while other characteristics are enhanced by lower amounts. The compositions allow many of the desirable characteristics of pure nondegradable polymers. In addition, the presence of plasticizer facilitates melt processing, and enhances the degradation rate of the compositions in contact with the wellbore environment. The intimately plasticized composition may be processed into a final product (e.g., a reducible material) in a manner adapted to retain the plasticizer as an intimate dispersion in the polymer for certain properties. These can include: (1) quenching the composition at a rate adapted to retain the plasticizer as an intimate dispersion; (2) melt processing and quenching the composition at a rate adapted to retain the plasticizer as an intimate dispersion; and (3) processing the composition into a final product in a manner adapted to maintain the plasticizer as an intimate dispersion. In certain embodiments, the plasticizers are at least intimately dispersed within the aliphatic polyester.

In an embodiment, the biodegradable material comprises a poly(anhydride). Poly(anhydride) hydrolysis proceeds, inter alia, via free carboxylic acid chain-ends to yield carboxylic acids as final degradation products. The erosion time can be varied by variation of the polymer backbone. Examples of suitable poly(anhydrides) include without limitation poly(adipic anhydride), poly(suberic anhydride), poly (sebacic anhydride), and poly(dodecanedioic anhydride). Other suitable examples include but are not limited to poly(maleic anhydride) and poly(benzoic anhydride).

In an embodiment, the biodegradable polymer comprises polysaccharides, such as starches, cellulose, dextran, substituted galactomannans, guar gums, high-molecular weight polysaccharides composed of mannose and galactose sugars, galactomannans, heteropolysaccharides obtained by the fermentation of starch-derived sugar (e.g., xanthan gum), diutan, scleroglucan, derivatives thereof, or combinations thereof.

In an embodiment, the biodegradable polymer comprises guar or a guar derivative, such as for example hydroxypropyl guar, carboxymethylhydroxypropyl guar, carboxymethyl guar, hydrophobically modified guars, guar-containing compounds, synthetic polymers, or combinations thereof.

In an embodiment, the biodegradable polymer comprises cellulose or a cellulose derivative, such as for example cellulose ethers, carboxycelluloses, carboxyalkylhydroxyethyl celluloses, hydroxyethylcellulose, hydroxypropylcellulose, carboxymethylhydroxyethylcellulose, carboxymethylcellulose, or combinations thereof.

In an embodiment, the biodegradable polymer comprises a starch, such as for example native starches, reclaimed starches, waxy starches, modified starches, pre-gelatinized starches, or combinations thereof.

In an embodiment, the degradable polymer comprises polyvinyl polymers, such as polyvinyl alcohols, polyvinyl acetate, partially hydrolyzed polyvinyl acetate, or combinations thereof.

In an embodiment, the degradable polymer comprises acrylic-based polymers, such as acrylic acid polymers, acrylamide polymers, acrylic acid-acrylamide copolymers, acrylic acid-methacrylamide copolymers, polyacrylamides, polymethacrylamides, partially hydrolyzed polyacrylamides, partially hydrolyzed polymethacrylamides, ammonium and alkali metal salts thereof, or combinations thereof.

In an embodiment, the degradable polymer comprises polyamides, such as polycaprolactam derivatives, poly-para-phenylene terephthalamide, or combinations thereof. In an embodiment, the degradable polymer comprises Nylon 6,6; Nylon 6; KEVLAR, or combinations thereof.

In an embodiment, the reducible material comprises crosslinked gel particulates containing an internal breaker, wherein the gel may comprise a viscosifying polymer, and wherein the crosslinker and the breaker may be of the type previously described herein for use in a servicing fluid.

In various embodiments, at least a portion of one or more of the reducible materials is self-degradable (e.g., self-degradable reducible materials). Namely, at least a portion of the one or more reducible materials is formed from biodegradable materials comprising a mixture of a degradable polymer, such as the aliphatic polyesters or poly(anhydrides) previously described, and a hydrated organic or inorganic solid compound. The degradable polymer will at least partially degrade in the releasable water provided by the hydrated organic or inorganic compound, which dehydrates over time when heated due to exposure to the wellbore environment.

Examples of the hydrated organic or inorganic solid compounds that can be utilized in the self-degradable reducible materials include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers.

In some embodiments, the reducible materials comprising one or more degradable materials of the type described herein are degraded subsequent to the performance of their intended function. Degradable materials and method of utilizing same are described in more detail in U.S. Pat. No. 7,093,664 which is incorporated by reference herein in its entirety.

In an embodiment, the reducible material may comprise Garolite. In an exemplary embodiment, the reducible material may comprise High-Temperature Garolite (G-11 Epoxy Grade). In other embodiments, the reducible material may comprise resin or epoxy materials that are at least partially degradable by exposure to water.

In various embodiments, the reducible material may comprise a disintegrable material (e.g., disintegrable reducible material). Materials that can disintegrate include plastics such as PLA, polyamides and composite materials comprising degradable plastics and non-degradable fine solids. It should be noted that some degradable materials pass through a disintegration stage during the degradation process; an example is PLA, which turns into fragile materials before complete degradation. In an embodiment, disintegration of at least one portion of the reducible material may yield smaller pieces that are flushed away or otherwise promote removal of the reducible material.

In an embodiment, the reducible material comprises a foamed reducible material. As used herein, a "foamed material" or a "foamed reducible material" refers to the three dimensional structure of a reducible material, which three dimensional foamed structure may be formed by trapping pockets of gas in a liquid or solid reducible material. In an embodiment the foamed material or foamed reducible material is an open-cell structure foam which herein refers to a high porosity, low density foam typically containing pores that are connected to each other. In an embodiment, the foamed material or foamed reducible material is a closed cell-structure foam which herein refers to a foam characterized by pores which are not connected to each other and has a higher density and compressive strength when compared to open-cell structure foams.

In an embodiment, reducible materials of the type described herein may be foamed using any suitable methodology compatible with the methods of the present disclosure. Methods of foaming materials of the type disclosed herein (e.g., reducible materials) include without limitation gas foaming, chemical agent foaming, injection molding, compression molding, extrusion molding, extrusion, melt extrusion, pressure reduction/vacuum induction, or any suitable combination of these methods.

In an embodiment, the foamed reducible material may be prepared from a composition comprising a reducible material and a foaming agent. The foaming agent may be any foaming agent compatible with the other components of the reducible material, such as for example physical blowing agents, chemical blowing agents, and the like.

In an embodiment, the foaming agent is a physical blowing agent. Physical blowing agents are typically nonflammable gases that are able to evacuate the composition quickly after the foam is formed. Examples of physical blowing agents include without limitation pentane, carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, and combinations thereof. In an embodiment, the physical blowing agent is incorporated into the reducible material in an amount of from about 0.1 wt. % to about 10 wt. %, alternatively from about 0.1 wt. % to about 5.0 wt. %, or alternatively from about 0.5 wt. % to about 2.5 wt. %, based on the total weight of the reducible material.

In an embodiment, the foaming agent is a chemical foaming agent, which may also be referred to as a chemical blowing agent. A chemical foaming agent is a chemical compound that decomposes endothermically at elevated temperatures. A chemical foaming agent suitable for use in this disclosure may decompose at temperatures of from about 250° F. to about 570° F., alternatively from about 330° F. to about 400° F. Decomposition of the chemical foaming agent generates gases that become entrained in the polymer thus leading to the formation of voids within the polymer. In an embodiment, a chemical foaming agent suitable for use in this disclosure may have a total gas evolution of from about 20 ml/g to about 200 ml/g, alternatively from about 75 ml/g to about 150 ml/g, or alternatively from about 110 ml/g to about 130 ml/g. Examples of chemical foaming agents suitable for use in this disclosure include without limitation SAFOAM FP-20, SAFOAM FP-40, SAFOAM FPN3-40, all of which are commercially available from Reedy International Corporation. In an embodiment, the chemical foaming agent may be incorporated in the reducible material in an amount of from about 0.10 wt. % to about 5 wt. % by total weight of the polymeric composition, alternatively from 0.25 about wt. % about to 2.5 wt. %, or alternatively from about 0.5 wt. % to about 2 wt. %, based on the total weight of the reducible material.

In an embodiment, the foamed reducible material is prepared by contacting the reducible material with the foaming agent, and thoroughly mixing the components, for example by compounding or extrusion. In an embodiment, the reducible material is plasticized or melted by heating in an extruder and is contacted and mixed thoroughly with a foaming agent of the type disclosed herein at a temperature of less than about 350° F. Alternatively, the reducible material may be contacted with the foaming agent prior to introduction of the mixture to the extruder (e.g., via bulk mixing), during the introduction of the polymer to an extruder, or combinations thereof.

The reducible materials of this disclosure may be converted to foamed particles by any suitable method. The foamed particles may be produced about concurrently with the mixing and/or foaming of the reducible materials (e.g., on a sequential, integrated process line) or may be produced subsequent to mixing and/or foaming of the reducible materials (e.g., on a separate process line such as an end use compounding and/or thermoforming line). In an embodiment, the reducible material is mixed and foamed via extrusion as previously described herein, and the molten reducible material is fed to a shaping process (e.g., mold, die, lay down bar, etc.) where the foamed reducible material is shaped. The foaming of the reducible material may occur prior to, during, or subsequent to the shaping. In an embodiment, molten reducible material is injected into a mold, where the reducible material undergoes foaming and fills the mold to form a shaped article (e.g., beads, block, sheet, and the like), which may be subjected to further processing steps (e.g., grinding, milling, shredding, etc.).

In an embodiment, the foamed reducible materials may be further processed by mechanically sizing, cutting or, chopping the foamed reducible materials into particles using any suitable methodologies for such processes.

In an embodiment, the porosity of a foamed reducible material suitable for use in this disclosure may range from about 1 volume percent (vol. %) to about 99 vol. %, alternatively from about 30 vol. % to about 70 vol. %, or alternatively from about 40 vol. % to about 50 vol. %. The porosity of a material is defined as the percentage of volume that the pores (i.e., voids, empty spaces) occupy based on the total volume of the material (e.g., reducible material). The porosity of the foamed reducible material may be determined using a porosity tester such as the Foam Porosity Tester F0023 which is commercially available from IDM Instruments.

In an embodiment, the pore size of a foamed reducible material suitable for use in this disclosure may range from about 0.1 microns to about 500 microns, alternatively from about 5 microns to about 200 microns, or alternatively from about 10 microns to about 100 microns. The pore size of the material may be determined using any suitable methodology such as scanning electron microscopy, atomic force microscopy, or a porosimeter.

The reducible materials (e.g., foamed reducible materials) suitable for use in this disclosure comprise particles of any suitable geometry, including without limitation beads, hollow beads, spheres, ovals, fibers, rods, pellets, platelets, disks, plates, ribbons, and the like, or combinations thereof.

In an embodiment, the reducible materials (e.g., foamed reducible materials) comprise a particle size of from about 10 microns to about 3,000 microns, alternatively from about 50 microns to about 2,000 microns, or alternatively from about 100 microns to about 1,000 microns.

In an embodiment, the reducible material may be included within the first slurry fluid in a suitable amount. In an embodiment, the reducible material is present within the first slurry fluid in an amount of from about 0.1 wt. % to about 50 wt. %, alternatively from about 1 wt. % to about 30 wt. %, or alternatively from about 5 wt. % to about 10 wt. %, based on the total weight of the first particulate material.

In an embodiment, the method of forming a PLPP further comprises the step of placing in the wellbore and/or subterranean formation, in an alternating sequence within a fracture (i) a second slurry fluid comprising a second particulate material (e.g., second particulate material clusters) and (ii) a spacer fluid, thereby forming the second proppant pack region. In an embodiment, placing in an alternating sequence within a fracture (e.g., fracture 10 as seen in FIG. 1) a second slurry fluid and a spacer fluid may form a structural arrangement of particulate material pillars and second flow channel spaces in the second proppant pack region, as previously described herein.

In an embodiment, the second slurry fluid comprises an aqueous base fluid, a viscosifying agent, and a second particulate material. In an embodiment, the second slurry fluid may further comprise a crosslinker, a breaker, or combinations thereof.

In an embodiment, the second slurry fluid comprises a second particulate material. In an embodiment, the second particulate material comprises a coated particulate material (e.g., a coated low-grade particulate material) such as coated sand (e.g., coated low-grade sand) that may be in the form of second particulate material clusters.

In an embodiment, the second slurry fluid comprises the spacer fluid further comprising a second particulate material (e.g., second particulate material clusters). In an embodiment, the first particulate material clusters and the second particulate material clusters may be the same. In another embodiment, the first particulate material clusters and the second particulate material clusters may be different.

In an embodiment, the spacer fluid comprises an aqueous base fluid and a viscosifying agent. In an embodiment, the spacer fluid may further comprise a crosslinker, a breaker, or combinations thereof.

In an embodiment, the first slurry fluid comprises the second slurry fluid and a reducible material.

In an embodiment, the alternating sequence of placing a second slurry fluid and a spacer fluid (i.e., pulsing or slugging the second slurry fluid with the spacer fluid) in the wellbore and/or subterranean formation comprises the steps of (i) placing a volume of the second slurry fluid in the wellbore and/or subterranean formation; (ii) placing a volume of the spacer fluid in the wellbore and/or subterranean formation; (iii) repeating steps (i) and (ii) until a sufficient amount of the second slurry fluid has been introduced to the wellbore and/or subterranean formation. As will be appreciated by one of skill in the art, and with the help of this disclosure, the alternating sequence of placing a second slurry fluid and a spacer fluid in the wellbore and/or subterranean formation may end with either the repetition of step (i) placing a volume of the second slurry fluid in the wellbore and/or subterranean formation, or with the repetition of step (ii) placing a volume of the spacer fluid in the wellbore and/or subterranean formation. In an embodiment, each step of the alternating sequence may last for a time period of from about 5 seconds to about 10 minutes, alternatively from about 10 seconds to about 5 minutes, alternatively from about 10 seconds to about 40 seconds, alternatively from about 15 seconds to about 30 seconds, or alternatively from about 15 seconds to about 2 minutes. As will be appreciated by one of skill in the art, and with the help of this disclosure, the length of the time period that each step of the alternating sequence may last for depends on pump rate, designed volumes, number of steps/pulses, volume of fluid delivered in each step/pulse, etc.

In an embodiment, the ratio between the volume of the second slurry fluid introduced to the wellbore and/or subterranean formation in a step of the alternating sequence and the volume of the spacer fluid introduced to the wellbore and/or subterranean formation in a step of the alternating sequence may be in the range of from about 10:1 to about 0.3:1, alternatively from about 10:1 to about 3:1, alternatively from about 3:1 to about 1:1, or alternatively from about 1:1 to about 0.3:1.

In an embodiment, the ratio (e.g., volumetric ratio) between the total volume of the first slurry fluid introduced to the wellbore and/or subterranean formation and the total volume of the second slurry fluid introduced to the wellbore and/or subterranean formation may be in the range of from about 4:1 to about 0.2:1, alternatively from about 4:1 to about 1:1, alternatively from about 1:1 to about 0.2:1, or alternatively from about 1:2 to about 2:3.

In an embodiment, the method of forming a PLPP further comprises the step of allowing the fracture to close. In an embodiment, the fracture (e.g., fracture 10) may close when fracturing pressures (e.g., hydraulic pressures used to fracture a wellbore and/or subterranean formation) are at least in part removed. In an alternative embodiment, the fracture (e.g., fracture 10) may close due to a portion of fracturing fluid (e.g., pad fluid, spacer fluid, first slurry fluid, second slurry fluid) leaking off into the subterranean formation, thereby decreasing the hydraulic pressure that was used to create the fracture.

Without wishing to be limited by theory, when the fracture is allowed to close, the low-grade particulate material present in the fracture can sustain a certain amount of stress because the low-grade particulate material has some flatter surfaces (e.g., angular surfaces) when compared with the high-grade particulate material. Further, without wishing to be limited by theory, the stress arising from the fracture closing would be transmitted through the low-grade particulate material particle flat surfaces (e.g., angular surfaces) without the particle substantially shifting or moving spatially, thereby preserving the three dimensional structure of the PLPP and allowing the coating agent of the low-grade particulate materials to complete the curing process, if such curing process was not finalized by the time the fracture was allowed to close.

In an embodiment, the method of forming a PLPP further comprises the step of allowing the fluids to break and the reducible materials to degrade.

In an embodiment, following a wellbore servicing operation (e.g., a fracturing operation wherein a PLPP is formed) utilizing a WSF (e.g., pad fluid, first slurry fluid, spacer fluid, second slurry fluid) comprising a viscosifying agent, the wellbore and/or the subterranean formation may be prepared for production, for example, production of a hydrocarbon, therefrom. Once the fracture closes, the flow spaces of the PLPP (e.g., first flow channels, second flow channels) are filled with the WSF (e.g., pad fluid, first slurry fluid, spacer fluid, second slurry fluid) and should be cleaned out to maximize conductivity of the PLPP.

In an embodiment, preparing the wellbore and/or formation for production may comprise removing the WSF by allowing the WSF to break. "Breaking" as used herein refers to a phenomenon in which the viscosity of a WSF is reduced to such a level that the WSF can be flushed from the formation by flowing formation fluids and returned to the surface and recovered for disposal or reuse. In an embodiment, breaking a WSF may be accomplished by using a breaker, and such breaking may be enhanced by the downhole environmental conditions (e.g., temperature, pressure, pH, etc.). The viscosity of most WSFs would reduce naturally if given enough time and at a sufficient temperature, however, such methods generally are not practical as it is generally highly desirable to return the well back to production as quickly as possible, as opposed to waiting for the viscosity of WSFs to naturally decrease over time. As will be appreciated by one of skill in the art, and with the help of this disclosure, the WSFs might start to break as soon as the breaker is added to the fluid (i.e., prior to the fluid being introduced to the wellbore and/or subterranean formation), and this issue may be circumvented by a variety of approaches, such as for example using excess viscosifying agent, encapsulating the breakers, etc.

In an embodiment, the reducible materials may degrade upon placement in the fracture (e.g., the first proppant pack region), as previously described herein. As will be appreciated by one of skill in the art, and with the help of this disclosure, some reducible materials may start to degrade as soon as they are added to a WSF, due to the interactions with the other components of the WSF. However, the reducible materials suitable for use in the present disclosure are designed to undergo the majority of their degradation upon placement in the fracture (e.g., the first proppant pack region), thereby forming the first flow channels of the first proppant pack region.

In an embodiment, the method of producing a PLPP comprises (I) placing in a wellbore and/or subterranean formation (a) a pad fluid and allowing the creation of at least a fracture therein, (b) a first slurry fluid comprising the pad fluid, a reducible material and a first particulate material (e.g., a plurality of first particulate material clusters), and (c) in an alternating sequence within said fracture (i) a second slurry fluid comprising the first particulate material (e.g., a plurality of first particulate material clusters) and (ii) a spacer fluid, wherein the pad fluid and the spacer fluid are the same, and wherein the second slurry fluid comprises the spacer fluid and the first particulate material (e.g., a plurality of first particulate material clusters); (II) allowing the fracture to close; and (III) allowing the fluids to break and the reducible materials to degrade, thereby forming the PLPP. In such embodiment, the pad fluid and/or the spacer fluid comprises HPG viscosifying agent, a boron compound crosslinker, and an enzyme and/or an oxidizer breaker; the reducible material comprises foamed PLA particles further comprising KCl; the first particulate material comprises low-grade sand (e.g., beach sand with a roundness of about 0.5 and a sphericity of about 0.3) coated with one or more components of EXPEDITE proppant flowback control and formed into clusters; and the first slurry fluid comprises the second slurry fluid and the foamed PLA particles comprising KCl. In an embodiment, the alternating sequence of placing a second slurry fluid and a spacer fluid in the wellbore and/or subterranean formation comprises placing a volume of the second slurry fluid for a time period of from about 10 seconds to about 40 seconds, preferably from about 15 seconds to about 30 seconds; placing a volume of the spacer fluid for a time period of from about 10 seconds to about 40 seconds, preferably from about 15 seconds to about 30 seconds; and repeating this alternating sequence until a sufficient amount of the second slurry fluid has been introduced to the wellbore and/or subterranean formation, thereby creating a structural arrangement of particulate material pillars and second flow channels.

In an embodiment, the method of producing a PLPP comprises (I) placing in a wellbore and/or subterranean formation (a) a pad fluid and allowing the creation of at least a fracture therein, (b) a first slurry fluid comprising the pad fluid, a reducible material and a first particulate material (e.g., a plurality of first particulate material clusters), and (c) in an alternating sequence within said fracture (i) a second slurry fluid comprising the first particulate material (e.g., a plurality of first particulate material clusters) and (ii) a spacer fluid, wherein the pad fluid and the spacer fluid are the same, and wherein the second slurry fluid comprises the spacer fluid and the first particulate material clusters; (II) allowing the fracture to close; and (III) allowing the fluids to break and the reducible materials to degrade, thereby forming the PLPP. In such embodiment, the pad fluid and/or the spacer fluid comprises CMHPG viscosifying agent, a zirconium complex crosslinker, and an enzyme and/or an oxidizer breaker; the reducible material comprises foamed PGA particles further comprising NaCl; the first particulate material comprises low-grade sand (e.g., beach sand with a roundness of about 0.5 and a sphericity of about 0.3) coated with one or more components of SANDWEDGE conductivity enhancement system and formed into clusters; and the first slurry fluid comprises the second slurry fluid and the foamed PGA particles comprising KCl. In an embodiment, the alternating sequence of placing a second slurry fluid and a spacer fluid in the wellbore and/or subterranean formation comprises placing a volume of the second slurry fluid for a time period of from about 10 seconds to about 40 seconds, preferably from about 15 seconds to about 30 seconds; placing a volume of the spacer fluid for a time period of from about 10 seconds to about 40 seconds, preferably from about 15 seconds to about 30 seconds; and repeating this alternating sequence until a sufficient amount of the second slurry fluid has been introduced to the wellbore and/or subterranean formation, thereby creating a structural arrangement of particulate material pillars and second flow channels.

In an embodiment, the methods and compositions disclosed herein for producing a PLPP may be advantageously employed in the performance of one or more wellbore servicing operations. In an embodiment, the particulate material (e.g., first particulate material, second particulate material) may advantageously comprise a low-grade particulate material (e.g., coated low-grade particulate material). In an embodiment, the use of a coated low-grade particulate material provides a cost-effective method for a fracturing wellbore servicing operation, since most of the fracture is occupied with the low-grade particulate material (e.g., low-cost low-grade sand). Generally the cost of high-grade particulate materials is high, as the high-grade particulate materials have to meet certain criteria, such as a certain roundness, sphericity, particle size distribution, etc. Additionally, when the reducible material is a foamed reducible material, the lower cost of the reducible material is due to a lower amount of reducible material necessary to occupy the same volume.

In an embodiment, the methods and compositions disclosed herein for producing a PLPP advantageously comprise forming particulate material pillars and second flow channels in the second proppant pack region, and not across $L_f$. The use of an alternating sequence of a second slurry fluid and a spacer fluid advantageously takes place toward the end of the fracturing operation to provide highly conductive flow paths and/or to connect natural resources (e.g., oil) reservoirs present in the subterranean formation with the wellbore.

In an embodiment, the second flow channels of the second proppant pack region are highly conductive channels and may advantageously handle all the fluid production converging toward the wellbore. The second flow channels of the second proppant pack region could advantageously minimize the build-up of pressure and shear stress in the NWR. The use of a coating agent on the low-grade particulate material may advantageously prevent a potential collapse of particulate material pillars resulting from shear erosion.

In an embodiment, the first proppant pack region may be advantageously packed with a low-grade particulate material. In an embodiment, the fracture flow capacity of first proppant pack region may be advantageously increased by using reducible materials uniformly distributed throughout the first proppant pack region, which upon degradation may advantageously yield first flow channels uniformly distributed throughout the first proppant pack region. During a fracturing operation, it may not be necessary to form particulate material pillars and large flow channels (e.g., second flow channles) in the FWR of the fracture. Generally, flow rates of fluids entering the fracture in the FWR is extremely low in comparison with the flow rates of fluids entering the fracture in the NWR, therefore forming large flow channel spaces in the FWR is impractical. The flow velocity of fluids through the first proppant pack region is low, leading to a low shear stress in the first proppant pack region. In an embodiment, the use of a coating agent on the low-grade particulate material may be advantageously sufficient to handle the shear stress in the first proppant pack region. Additional advantages of the methods and compositions disclosed herein for producing a PLPP may be apparent to one of skill in the art viewing this disclosure.

The embodiments having been generally described, the following examples are given as particular embodiments of the disclosure and to demonstrate the practice and advantages thereof. It is understood that the examples are given by way of illustration and are not intended to limit the specification or the claims in any manner.

The properties of coated low-grade particulate materials were investigated. More specifically the ability of coated low-grade sand to form clusters or aggregates was investigated. Low-grade sand was coated with a tackifying agent in a first experiment, and with a consolidationg agent in a second experiment. The low-grade sand was coated by adding 11 mL of a curable coating agent to 250 grams of low-grade sand. The tackifying agent used was a component of SANDWEDGE conductivity enhancement system, and the consolidating agent uses was a component of EXPEDITE proppant flowback control. The coated low-grade sand was visually observed to form low-grade sand clusters, rather than individual sand grains that are commonly observed with uncoated sand, regardless of whether the coating agent was a tackifying agent or a consolidating agent.

The coated low-grade sand was further mixed with a reducible material (e.g., degradable particulates) by adding polylactic acid particulates to the coated low-grade sand and blending thoroughly to form a homogeneous blend. It was observed that the reducible material (e.g., polylactic acid particulates) was distributed uniformly throughout the coated low-grade sand clusters. The mixture of coated low-grade sand and reducible material (e.g., polylactic acid particulates) was further mixed with water to form a slurry. The slurry was then packed into a brass flow cell and placed in an oven to be cured under a 500-psi stress load at 275° F. for 4 days, thereby forming a sand pack. The coating of tackifying agent and/or consolidating agent on sand particulates helps distribute the degradable particulates homogeneously in the sand slurry and ultimately the sand pack. It was also observed that the adhesion between coated low-grade sand clusters and the degradable particulates overcomes the segregation of particulates even when there is a density difference between the two particulate materials (e.g., coated low-grade sand and degradable particulates).

The properties of a sand pack were investigated. More specifically the ability of reducible materials to increase the permeability of a sand pack was investigated. A control sand pack was assembled by using frac sand and the sand pack was tested for permeability. The same type of sand was mixed with a reducible material (e.g., polylactic acid particulates) and the resulting mixture was formed into a test sand pack. The sand for each experiment was coated with a coating agent as described in Example 1, followed by mixing with water to form a mixture. In the case of the test sand pack, the reducible material (e.g., polylactic acid particulates) was mixed with the coated sand prior to the addition of water to form the slurry. For each experiment, the sand pack was assembled as described in Example 1. After the curing period, permeability testing was performed for the consolidated proppant matrixes. The curing period degraded the reducible material (e.g., polylactic acid particulates).

In one experiment, the sand was mixed with 5 wt. % of reducible material (e.g., polylactic acid particulates) based on the weight of the sand, and the permeability of the resulting sand pack was measured to be 100% higher than the permeability of the control sand pack which contained no reducible materials. In another experiment, the sand was mixed with 10 wt. % of reducible materials (e.g., polylactic acid particulates) based on the weight of the sand, and the permeability of the resulting sand pack was measured to be 200% higher than the permeability of the control sand pack which contained no degradable particulates.

ADDITIONAL DISCLOSURE

The following are nonlimiting specific embodiments in accordance with the present disclosure:

A first embodiment, which is a method of servicing a wellbore in a subterranean formation comprising placing in the wellbore and/or subterranean formation a pad fluid and forming a fracture in the subterranean formation, placing in the fracture a first slurry fluid comprising a reducible material and a first particulate material, placing in the fracture, in an alternating sequence, a second slurry fluid and a spacer fluid, wherein the second slurry fluid comprises a second particulate material, allowing the fracture to close, and allowing the fluids to break and the reducible materials to degrade, wherein a particulate-laden proppant pack (PLPP) is formed.

A second embodiment, which is the method of the first embodiment wherein the pad fluid and the spacer fluid are the same.

A third embodiment, which is the method of any of the first through the second embodiments wherein the first slurry fluid comprises the second slurry fluid and the reducible material.

A fourth embodiment, which is the method of any of the first through the third embodiments wherein a volumetric ratio between the first slurry fluid and the second slurry fluid is in the range of from about 4:1 to about 0.2:1.

A fifth embodiment, which is the method of any of the first through the fourth embodiments wherein the first particulate material and the second particulate material are the same.

A sixth embodiment, which is the method of any of the first through the fifth embodiments wherein the first particulate material comprises a plurality of first particulate material clusters.

A seventh embodiment, which is the method of any of the first through the sixth embodiments wherein the second particulate material comprises a plurality of second particulate material clusters.

An eighth embodiment, which is the method of any of the first through the seventh embodiments wherein the first particulate material and/or the second particulate material comprises a low-grade particulate material.

A ninth embodiment, which is the method of the eighth embodiment wherein the low-grade particulate material is coated with a tackifying agent, a consolidating agent, or combinations thereof.

A tenth embodiment, which is the method of any of the eighth through the ninth embodiments wherein the low-grade particulate material is characterized by a roundness of less than about 0.6 and/or a sphericity of less than about 0.6.

An eleventh embodiment, which is the method of any of the eighth through the tenth embodiments wherein the low-grade particulate material comprises low-grade sand.

A twelfth embodiment, which is the method of any of the first through the eleventh embodiments wherein the reducible material comprises a frangible material, an erodible material, a dissolvable material, a consumable material, a thermally degradable material, a meltable material, a boilable material, a degradable material, a biodegradable material, an ablatable material, or combinations thereof.

A thirteenth embodiment, which is the method of any of the first through the twelfth embodiments wherein the reducible material comprises degradable polymers, polymeric materials, hardened plastics, rubbers, derivatives thereof, or combinations thereof.

A fourteenth embodiment, which is the method of the thirteenth embodiment wherein the degradable polymers comprise polysaccharides; lignosulfonates; chitins; chitosans; proteins; proteinous materials; fatty alcohols; fatty esters; fatty acid salts; orthoesters; aliphatic polyesters; poly(lactides); poly(glycolides); poly(ϵ-caprolactones); polyoxymethylene; polyurethanes; poly(hydroxybutyrate); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates; and copolymers, blends, derivatives, or combinations thereof.

A fifteenth embodiment, which is the method of the fourteenth embodiment wherein the aliphatic polyester is represented by general formula I:

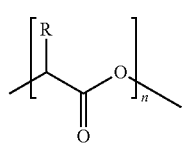

Formula I where n is an integer ranging from about 75 to about 10,000 and R comprises hydrogen, an alkyl group, an aryl group, alkylaryl groups, acetyl groups, heteroatoms, or combinations thereof.

A sixteenth embodiment, which is the method of any of the fourteenth through the fifteenth embodiments wherein the aliphatic polyester comprises polylactic acid, polyglycolic acid, or combinations thereof.

A seventeenth embodiment, which is the method of any of the first through the sixteenth embodiments wherein the reducible material comprises a foamed reducible material.

An eighteenth embodiment, which is the method of any of the first through the seventeenth embodiments wherein the reducible material is present within the first slurry fluid in an amount of from about 0.1 wt. % to about 10 wt. %, based on the total weight of the first particulate material.

A nineteenth embodiment, which is the method of any of the first through the eighteenth embodiments wherein the alternating sequence comprises (i) placing a volume of the second slurry fluid in the wellbore and/or subterranean formation; (ii) placing a volume of the spacer fluid in the wellbore and/or subterranean formation; (iii) repeating steps (i) and (ii) until a sufficient amount of the second slurry fluid has been introduced to the wellbore and/or subterranean formation.

A twentieth embodiment, which is the method of the nineteenth embodiment wherein the placing of (i) and/or (ii) last for a time period of from about 5 seconds to about 10 minutes.

A twenty-first embodiment, which is the method of any of the first through the twentieth embodiments wherein the PLPP comprises (i) a mosaic structure and (ii) an effective length $L_f$, wherein (a) a first proppant pack region spans across a far wellbore length $L_{ff}$ of a far wellbore region of the subterranean formation, and (b) a second proppant pack region spans across a near wellbore length $L_{fn}$ of a near wellbore region of the subterranean formation, wherein $L_{ff}$ is equal to or greater than about 35% of $L_f$, wherein $L_{fn}$ is less than about 65% of $L_f$, and wherein $L_f = L_{ff} + L_{fn}$.

A twenty-second embodiment, which is the method of the twenty-first embodiment wherein the first proppant pack region comprises a plurality of first flow channels and the first particulate material wherein the first flow channels are uniformly distributed throughout the first proppant pack region.

A twenty-third embodiment, which is the method of any of the twenty-first through the twenty-second embodiments wherein the second proppant pack region comprises a structural arrangement of particulate material pillars and second flow channels.

A twenty-fourth embodiment, which is a method of servicing a wellbore in a subterranean formation comprising: placing in the wellbore and/or subterranean formation a pad fluid and forming a fracture in the subterranean formation, placing in the fracture a first slurry fluid comprising a reducible material and a plurality of low-grade sand clusters, placing in the fracture, in an alternating sequence, a second slurry fluid and a spacer fluid, wherein the second slurry fluid comprises a plurality of low-grade sand clusters, and wherein the pad fluid and the spacer fluid are the same, allowing the fracture to close, and allowing the fluids to break and the reducible materials to degrade, wherein a particulate-laden proppant pack is formed.

A twenty-fifth embodiment, which is the method of the twenty-fourth embodiment wherein the first slurry fluid comprises the second slurry fluid and the reducible material.

A twenty-sixth embodiment, which is the method of any of the twenty-fourth through the twenty-fifth embodiments wherein the reducible material comprises foamed polylactic acid and/or polyglycolic acid further comprising an inorganic salt.

A twenty-seventh embodiment, which is a particulate-laden proppant pack (PLPP) disposed within a fracture of a subterranean formation, wherein the PLPP comprises (i) a mosaic structure and (ii) an effective length $L_f$, wherein (a) a first proppant pack region spans across a far wellbore length $L_{ff}$ of a far wellbore region of the subterranean formation, and (b) a second proppant pack region spans across a near wellbore length $L_{fn}$ of a near wellbore region of the subterranean formation, wherein $L_{ff}$ is equal to or greater than about 35% of $L_f$, wherein $L_{fn}$ is less than about 65% of $L_f$, and wherein $L_f = L_{ff} + L_{fn}$.

A twenty-eighth embodiment, which is the PLPP of the twenty-seventh embodiment wherein the first proppant pack region comprises a reducible material and a first particulate material.

A twenty-ninth embodiment, which is the PLPP of the twenty-eighth embodiment wherein the reducible material is uniformly distributed throughout the first proppant pack region.

A thirtieth embodiment, which is the PLPP of any of the twenty-eighth through the twenty-ninth embodiments wherein the first particulate material comprises a plurality of first particulate material clusters.

A thirty-first embodiment, which is the PLPP of the thirtieth embodiment wherein the first particulate material clusters comprise a coated low-grade particulate material.

A thirty-second embodiment, which is the PLPP of any of the twenty-eighth through the thirty-first embodiments wherein the reducible material degrades to form a plurality of first flow channels.

A thirty-third embodiment, which is the PLPP of the thirty-second embodiment wherein the first flow channels are uniformly distributed throughout the first proppant pack region.

A thirty-fourth embodiment, which is the PLPP of any of the thirty-second through the thirty-third embodiments wherein the volume of the first flow channels is from about 5% to about 50% greater than the volume of flow channels that would be created by the same amount of particulate material delivered in the same first proppant pack region in the absence of a reducible material.

A thirty-fifth embodiment, which is the PLPP of any of the twenty-seventh through the thirty-fourth embodiments wherein the first proppant pack region has a fracture flow capacity of from about 25% to about 200% greater than a fracture flow capacity of a first proppant pack region that would be created by the same amount of particulate material delivered in the same first proppant pack region in the absence of a reducible material.

A thirty-sixth embodiment, which is the PLPP of any of the twenty-seventh through the thirty-fifth embodiments wherein the second proppant pack region comprises a structural arrangement of particulate material pillars and second flow channels.

A thirty-seventh embodiment, which is the PLPP of the thirty-sixth embodiment wherein the structural arrangement of particulate material pillars and second flow channels is created by placing in an alternating sequence a second slurry fluid and a spacer fluid in the second proppant pack region.

A thirty-eighth embodiment, which is the PLPP of any of the thirty-sixth through the thirty-seventh embodiments wherein the particulate material pillars comprise a second particulate material.

A thirty-ninth embodiment, which is the PLPP of the thirty-eighth embodiment wherein the second particulate material comprises a plurality of second particulate material clusters.

A fortieth embodiment, which is the PLPP of the thirty-ninth embodiment wherein the second particulate material clusters comprise a coated low-grade particulate material.

A forty-first embodiment, which is the PLPP of any of the thirty-sixth through the fortieth embodiments wherein the volume of the second flow channels is from about 30% to about 60% greater than the volume of flow channels that would be created by the same amount of particulate material delivered in the same second proppant pack region by the second slurry fluid used in the absence of the spacer fluid.

A forty-second embodiment, which is the PLPP of any of the thirty-sixth through the forty-first embodiments wherein the second proppant pack region has a fracture flow capacity of from about 25% to about 200% greater than a fracture flow capacity of a second proppant pack region that would be created by the same amount of particulate material delivered in the same second proppant pack region by the second slurry fluid used in the absence of the spacer fluid.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   placing in the wellbore and/or subterranean formation a pad fluid and forming a fracture in the subterranean formation;
   placing in the fracture a first slurry fluid comprising a reducible material and a first particulate material;
   placing in the fracture, in an alternating sequence, a second slurry fluid and a spacer fluid, wherein the second slurry fluid comprises a second particulate material;
   allowing the fracture to close; and
   allowing the fluids to break and the reducible materials to degrade, wherein a particulate-laden proppant pack (PLPP) is formed, wherein the PLPP comprises (i) a mosaic structure and (ii) an effective length $L_f$, wherein (a) a first proppant pack region spans across a far wellbore length $L_{ff}$ of a far wellbore region of the subterranean formation, and (b) a second proppant pack region spans across a near wellbore length $L_{fn}$ of a near wellbore region of the subterranean formation, wherein $L_{ff}$ is equal to or greater than about 35% of $L_f$, wherein $L_{fn}$ is less than about 65% of $L_f$, and wherein $L_f=L_{ff}+L_{fn}$.

2. The method of claim 1 wherein the pad fluid and the spacer fluid are the same.

3. The method of claim 1 wherein the first slurry fluid comprises the second slurry fluid and the reducible material.

4. The method of claim 1 wherein a volumetric ratio between the first slurry fluid and the second slurry fluid is in the range of from about 4:1 to about 0.2:1.

5. The method of claim 1 wherein the first particulate material and the second particulate material are the same.

6. The method of claim 1 wherein the first particulate material comprises a plurality of first particulate material clusters.

7. The method of claim 1 wherein the second particulate material comprises a plurality of second particulate material clusters.

8. The method of claim 1 wherein the first particulate material and/or the second particulate material comprises a low-grade particulate material.

9. The method of claim 8 wherein the low-grade particulate material comprises low-grade sand.

10. The method of claim 1 wherein the reducible material comprises at least one material selected from the group consisting of: a degradable polymer, a polymeric material, a hardened plastic, a rubber, any derivative thereof, and any combination thereof.

11. The method of claim 10 wherein the degradable polymer is selected from the group consisting of: a polysaccharide; a lignosulfonate; a chitin; a chitosan; a protein; a proteinous material; a fatty alcohol; a fatty ester; a fatty acid salt; an orthoester; an aliphatic polyester; a poly(lactide); a poly(glycolide); a poly(ε-caprolactone); a polyoxymethylene; a polyurethane; a poly(hydroxybutyrate); a poly(anhydride); an aliphatic polycarbonate; a polyvinyl polymer; an acrylic-based polymer; a poly(amino acid); a poly(aspartic acid); a poly(alkylene oxide); a poly(ethylene oxide); a polyphosphazene; a poly(orthoester); a poly(hydroxy ester ether); a polyether ester; a polyester amide; a polyamide; a polyhdroxyalkanoate; a polyethyleneterephthalate; a polybutyleneterephthalate; a polyethylenenaphthalenate; and any copolymer, blend, derivative, and combination thereof.

12. The method of claim 1 wherein the reducible material comprises a foamed reducible material.

13. The method of claim 1 wherein the reducible material is present within the first slurry fluid in an amount of from about 0.1 wt. % to about 10 wt. %, based on the total weight of the first particulate material.

14. The method of claim 1 wherein the alternating sequence comprises (i) placing a volume of the second slurry fluid in the wellbore and/or subterranean formation; (ii) placing a volume of the spacer fluid in the wellbore and/or subterranean formation; (iii) repeating (i) and (ii) until a sufficient amount of the second slurry fluid has been introduced to the wellbore and/or subterranean formation.

15. The method of claim 1 wherein the first proppant pack region comprises a plurality of first flow channels and the first particulate material wherein the first flow channels are uniformly distributed throughout the first proppant pack region.

16. A particulate-laden proppant pack (PLPP) disposed within a fracture of a subterranean formation, wherein the PLPP comprises (i) a mosaic structure and (ii) an effective length $L_f$, wherein (a) a first proppant pack region spans across a far wellbore length $L_{ff}$ of a far wellbore region of the subterranean formation, and (b) a second proppant pack region spans across a near wellbore length $L_{fn}$ of a near wellbore region of the subterranean formation, wherein $L_{ff}$ is equal to or greater than about 35% of $L_f$, wherein $L_{fn}$ is less than about 65% of $L_f$, and wherein $L_f = L_{ff} + L_{fn}$.

* * * * *